(12) United States Patent
Murai et al.

(10) Patent No.: US 7,754,323 B2
(45) Date of Patent: Jul. 13, 2010

(54) FIBER-REINFORCED THERMOPLASTIC RESIN MOLDED ARTICLE, MOLDING MATERIAL, AND METHOD FOR PRODUCTION OF THE MOLDED ARTICLE

(75) Inventors: Shoji Murai, Matsuyama (JP); Masato Honma, Matsuyama (JP)

(73) Assignee: Toray industries, Inc., Tokyo (JP)

( * ) Notice: Subject to any disclaimer, the term of this patent is extended or adjusted under 35 U.S.C. 154(b) by 135 days.

(21) Appl. No.: 12/224,340

(22) PCT Filed: Feb. 19, 2007

(86) PCT No.: PCT/JP2007/053443

§ 371 (c)(1),
(2), (4) Date: Aug. 25, 2008

(87) PCT Pub. No.: WO2007/097436

PCT Pub. Date: Aug. 30, 2007

(65) Prior Publication Data
US 2009/0004453 A1    Jan. 1, 2009

(30) Foreign Application Priority Data
Feb. 24, 2006  (JP)  ............................ 2006-047987

(51) Int. Cl.
*B32B 17/12* (2006.01)
(52) U.S. Cl. ............. 428/297.4; 428/299.1; 264/331.11
(58) Field of Classification Search ............... 428/297.4, 428/299.1, 408; 264/331.11, 500
See application file for complete search history.

(56) References Cited

U.S. PATENT DOCUMENTS

| 4,734,321 | A | | 3/1988 | Radvan et al. ............... 428/283 |
| 6,051,307 | A | * | 4/2000 | kido et al. ................. 428/297.4 |
| 6,117,551 | A | * | 9/2000 | Nagata et al. ............... 428/408 |
| 2009/0004453 | A1 | * | 1/2009 | Murai et al. .............. 428/299.1 |

FOREIGN PATENT DOCUMENTS

| EP | 1 731 553 A1 | 12/2006 |
| GB | 1 410 107 | 10/1975 |
| JP | SHO-48-27554 B | 8/1973 |
| JP | 51-16366 A | 2/1976 |
| JP | SHO-52-13214 | 4/1977 |
| JP | HEI-02-191635 | 7/1990 |
| JP | HEI-05-069441 | 3/1993 |

* cited by examiner

*Primary Examiner*—N. Edwards
(74) *Attorney, Agent, or Firm*—Kubovcik & Kubovcik

(57) ABSTRACT

According to the present invention, a fiber-reinforced thermoplastic resin molded article in which monofilamentous carbon fibers are contained in a thermoplastic resin in a high content, such fibers having long fiber lengths and being randomly arranged, is provided. Also, a molding material comprising monofilamentous carbon fibers and monofilamentous thermoplastic resin fibers, in which the carbon fibers are contained in a high content, such fibers having long fiber lengths and being randomly arranged, is provided. In addition, a method for producing a fiber-reinforced thermoplastic resin molded article, comprising molding the molding material by compression molding, is provided.

18 Claims, 4 Drawing Sheets

0.5mm

FIBER-REINFORCED THERMOPLASTIC RESIN MOLDED ARTICLE, MOLDING MATERIAL, AND METHOD FOR PRODUCTION OF THE MOLDED ARTICLE

This application is a 371 of international application PCT/JP2007/053443 filed Feb. 19, 2007, which claims priority based on Japanese patent application No. 2006-047987 filed Feb. 24, 2006, which is incorporated herein by reference.

TECHNICAL FIELD

The present invention relates to a fiber-reinforced thermoplastic resin molded article, a molding material, and a method for production of the molded article. The fiber-reinforced thermoplastic resin molded article of the present invention contains monofilamentous carbon fibers in a high content, such fibers having long fiber lengths and being randomly arranged. Thus, it is excellent in terms of mechanical properties and isotropy so as to be preferably used for parts such as structural parts, housings, and the like for electric/electronic devices, civil engineering and building products, automobiles, and airplanes. The molding material of the present invention comprises monofilamentous carbon fibers and monofilamentous thermoplastic resin fibers and thus is excellent in terms of handleability. In addition, it contains carbon fibers in a high content, such fibers having long fiber lengths and being randomly arranged. Thus, it can be preferably used to mold fiber-reinforced thermoplastic resin molded articles that are excellent in terms of mechanical properties and isotropy. The production method of the present invention involves a compression molding method using the above molding material. The method is preferably used for production of fiber-reinforced thermoplastic resin molded articles that are excellent in terms of mechanical properties and isotropy.

BACKGROUND ART

Fiber-reinforced thermoplastic resin molded articles comprising carbon fibers and a thermoplastic resin are excellent in terms of specific strength and specific stiffness. Thus, they are widely used in electric/electronic applications, civil engineering and building applications, automobile applications, airplane applications, and the like.

In general, in order to improve mechanical properties, continuous carbon fibers are used in fiber-reinforced thermoplastic resin molded articles in some cases. On the other hand, in some cases, moldability deteriorates, and thus it is difficult to produce fiber-reinforced thermoplastic resin molded articles having complicated shapes. Thus, discontinuous carbon fibers are preferably used to produce fiber-reinforced thermoplastic resin molded articles having complicated shapes.

For instance, a fiber-reinforced thermoplastic resin molded article in which reed-shaped pieces comprising a resin impregnated with carbon fiber bundles are arranged in a random direction has been suggested as a means of improving the mechanical properties and isotropy of such a fiber-reinforced thermoplastic resin molded article (see JP Patent No. 2507565 (page 4, line 18)). However, the presence of bundles of carbon fibers in a fiber-reinforced thermoplastic resin molded article results in generation of a resin-rich portion consisting of a resin in gaps between carbon fiber bundles, and this might cause a decrease in mechanical properties.

In addition, a thermoplastic resin molded article obtained by subjecting a stampable sheet comprising converged discontinuous carbon fibers and thermoplastic resin fibers to compression molding has been suggested (see JP Patent Publication (Kokai) No. 2002-212311 A (page 2, line 21)). However, the high melt viscosity of thermoplastic resin makes it impossible for a thermoplastic resin to impregnate converged carbon fiber bundles. Thus, non-impregnated portions are generated, and this might cause a decrease in mechanical properties.

Thus, a thermoplastic resin molded article obtained by subjecting a molding material comprising monofilamentous discontinuous carbon fibers (in a high volume content) and a thermoplastic resin powder to compression molding has been suggested (see JP Patent No. 1761874 (page 1, line 2)). However, such a molding material comprising discontinuous reinforcing fibers and thermoplastic resin particles is problematic in terms of poor handleability. This is because thermoplastic resin particles are detached from such a molding material in a step of producing a molding material, and particularly in a step of transferring a molding material, or in a step of producing a fiber-reinforced thermoplastic resin molded article, and particularly in a step of transferring and handling a molding material.

In addition, a fiber-reinforced thermoplastic resin molded article having high mechanical properties obtained by subjecting a fiber-reinforced resin sheet material obtained from uniformly dispersed carbon fibers and a thermoplastic resin to heat molding has been suggested (see JP Patent Publication (Kokai) No. 6-99431 A (1994) (page 2, line 50)). However, in such case, a fiber-reinforced resin sheet material becomes fluid in a step of subjecting a fiber-reinforced resin sheet material to heat molding, and thus carbon fibers are arranged in the flow direction of the fluid material, resulting in deterioration in isotropy as a mechanical property.

DISCLOSURE OF THE INVENTION

In view of the background of the conventional techniques, it is an objective of the present invention to provide a fiber-reinforced thermoplastic resin molded article with improved mechanical properties and isotropy, in which monofilamentous carbon fibers are contained in a thermoplastic resin in a high content, such carbon fibers having long fiber lengths and being randomly arranged.

In view of the background of the conventional techniques, it is an objective of the present invention to provide a molding material that can be preferably used for a fiber-reinforced thermoplastic resin molded article with excellent mechanical properties and isotropy, which comprises monofilamentous carbon fibers and monofilamentous thermoplastic resin fibers for the improvement of handleability, and in which the carbon fibers are contained in a thermoplastic resin in a high content, such carbon fibers having long fiber lengths and being randomly arranged.

In view of the background of the conventional techniques, it is an objective of the present invention to provide a method for producing a fiber-reinforced thermoplastic resin molded article with excellent mechanical properties and isotropy, comprising subjecting the molding material to compression molding.

In order to achieve the above objectives, the present invention includes the following constituent features.

(1) A fiber-reinforced thermoplastic resin molded article, which is a molded article comprising a thermoplastic resin (20% to 65% by weight) and carbon fibers (35% to 80% by weight), wherein the carbon fibers are monofilamentous fibers, the weight-average fiber length (Lw) of the carbon fibers is from 0.5 to 10 mm, and the herein-defined orientation parameter (fp) of the carbon fibers is from −0.25 to 0.25.

(2) The fiber-reinforced thermoplastic resin molded article according to (1), wherein the herein-defined dispersion parameter of the carbon fibers is from 0% to 25%.

(3) The fiber-reinforced thermoplastic resin molded article according to (1) or (2), wherein the maximum value of the herein-defined relative frequency (with a class interval of 30°) with respect to the frequency distribution of orientation angles of the carbon fibers is 0.29 or less.

(4) The fiber-reinforced thermoplastic resin molded article according to any one of (1) to (3), wherein the minimum value of the herein-defined relative frequency (with a class interval of 30°) with respect to the frequency distribution of orientation angles of the carbon fibers is 0.03 or more.

(5) The fiber-reinforced thermoplastic resin molded article according to any one of (1) to (4), wherein the number of carbon fibers having fiber lengths of 1.0 mm or more corresponds to 30% to 100% of the total number of the carbon fibers.

(6) The fiber-reinforced thermoplastic resin molded article according to any one of (1) to (5), wherein the herein-defined void fraction of the fiber-reinforced thermoplastic resin molded article is 5% or less.

(7) The fiber-reinforced thermoplastic resin molded article according to any one of (1) to (6), wherein the bending strength in accordance with ISO178 of the fiber-reinforced thermoplastic resin molded article is from 350 to 1100 MPa.

(8) The fiber-reinforced thermoplastic resin molded article according to any one of (1) to (7), wherein the stability of the bending strength in accordance with ISO178 of the fiber-reinforced thermoplastic resin molded article is 10% or less.

(9) A molding material, which is a molding material comprising thermoplastic resin fibers that are monofilamentous thermoplastic resin fibers (20% to 65% by weight) and carbon fibers that are monofilamentous carbon fibers (35% to 80% by weight), wherein the weight-average fiber length (Lw) of the carbon fibers is from 1 to 15 mm and the herein-defined orientation parameter (fp) of the carbon fibers is from −0.25 to 0.25.

(10) The molding material according to (9), wherein the monofilamentous thermoplastic resin fibers are in contact with at least two of the monofilamentous carbon fibers.

(11) The molding material according to (9) or (10), wherein the maximum value of the herein-defined relative frequency (with a class interval of 30°) with respect to the frequency distribution of orientation angles of the carbon fibers is 0.29 or less.

(12) The molding material according to any one of (9) to (11), wherein the minimum value of the herein-defined relative frequency (with a class interval of 30°) with respect to the frequency distribution of orientation angles of the carbon fibers is 0.03 or more.

(13) The molding material according to any one of (9) to (12), wherein the herein-defined dispersion parameter of the carbon fibers is from 0% to 25%.

(14) The molding material according to any one of (9) to (13), wherein the value corresponding to the ratio of weight-average fiber length of the carbon fibers (Lw) to number-average fiber length of the same (Ln) (Lw/Ln) is from 1.0 to 2.5.

(15) A method for producing a fiber-reinforced thermoplastic resin molded article, comprising molding the molding material according to any one of (9) to (14) by a compression molding method comprising at least the following steps (I) to (V):

(I): a step of heating and melting a thermoplastic resin contained in a molding material;

(II): a step of positioning the molding material in a die;

(III): a step of pressurizing the molding material with the die;

(IV): a step of solidifying the molding material in the die; and (V): a step of opening the die so as to demold a fiber-reinforced thermoplastic resin molded article therefrom.

(16) The method for producing a fiber-reinforced thermoplastic resin molded article according to (15), wherein an operation of releasing the pressurization on the molding material and repressurizing the molding material is repeated at least once in the step (III).

(17) The method for producing a fiber-reinforced thermoplastic resin molded article according to (15) or (16), wherein the pressure upon the compression molding is 2 to 40 MPa.

(18) The method for producing a fiber-reinforced thermoplastic resin molded article according to any one of (15) to (17), wherein the charging percentage of the molding material positioned in the cavity of the die is 80% or more.

In the fiber-reinforced thermoplastic resin molded article of the present invention, monofilamentous carbon fibers are contained in a thermoplastic resin in a high content, and such fibers have long fiber lengths and are randomly arranged. Thus, a fiber-reinforced thermoplastic resin molded article with high mechanical properties, particularly isotropic mechanical properties, can be obtained. Such fiber-reinforced thermoplastic resin molded article is preferably used for parts such as structural parts, housings, and the like for electric/electronic devices, office automation (OA) equipments, home electric appliances, civil engineering and building products, automobiles, and airplanes.

The molding material of the present invention comprises monofilamentous carbon fibers and monofilamentous thermoplastic resin fibers and thus is excellent in terms of handleability. In addition, carbon fibers are contained therein in a high content, and such fibers have long fiber lengths and are randomly arranged. Thus, a molding material that can be preferably used for a fiber-reinforced thermoplastic resin molded article with excellent mechanical properties and isotropy can be obtained.

In addition, a fiber-reinforced thermoplastic resin molded article with high mechanical properties, particularly isotropic mechanical properties, can be produced by subjecting the molding material to compression molding.

This description includes part or all of the contents as disclosed in the description and/or drawings of Japanese Patent Application No. 2006-47987, which is a priority document of the present application.

EXPLANATION OF REFERENCE NUMERALS

1: Carbon fiber
2: Thermoplastic resin

BEST MODE FOR CARRYING OUT THE INVENTION

Hereinafter, the fiber-reinforced thermoplastic resin molded article, the molding material, and methods for producing the molded article of the present invention are described in greater detail.

"Fiber-reinforced Thermoplastic Resin Molded Article"

The fiber-reinforced thermoplastic resin molded article of the present invention is a molded article comprising a thermoplastic resin (20% to 65% by weight) and carbon fibers (35% to 80% by weight), wherein the carbon fibers are monofilamentous carbon fibers, the weight-average fiber length (Lw) of the carbon fibers is from 0.5 to 10 mm, and the herein-defined orientation parameter (fp) of the carbon fibers is from −0.25 to 0.25.

The weight content of carbon fibers in the fiber-reinforced thermoplastic resin molded article of the present invention is 35% to 80% by weight, more preferably 38% to 75% by weight, and further preferably 40% to 70% by weight with respect to the weight of the fiber-reinforced thermoplastic resin molded article. When the weight content of carbon fibers is less than 35% by weight, mechanical properties of the fiber-reinforced thermoplastic resin molded article might become insufficient when it is used for structural parts. Further, when a molding material becomes fluid in a step of molding a molded article such that carbon fibers become oriented in the flow direction of the fluid material, isotropy in mechanical properties might deteriorate. In addition, when the weight content of carbon fibers exceeds 80% by weight, the amount of a thermoplastic resin relative to that of carbon fibers is essentially decreased. Accordingly, the mechanical properties of a fiber-reinforced thermoplastic resin molded article might be significantly reduced.

Figure 1:
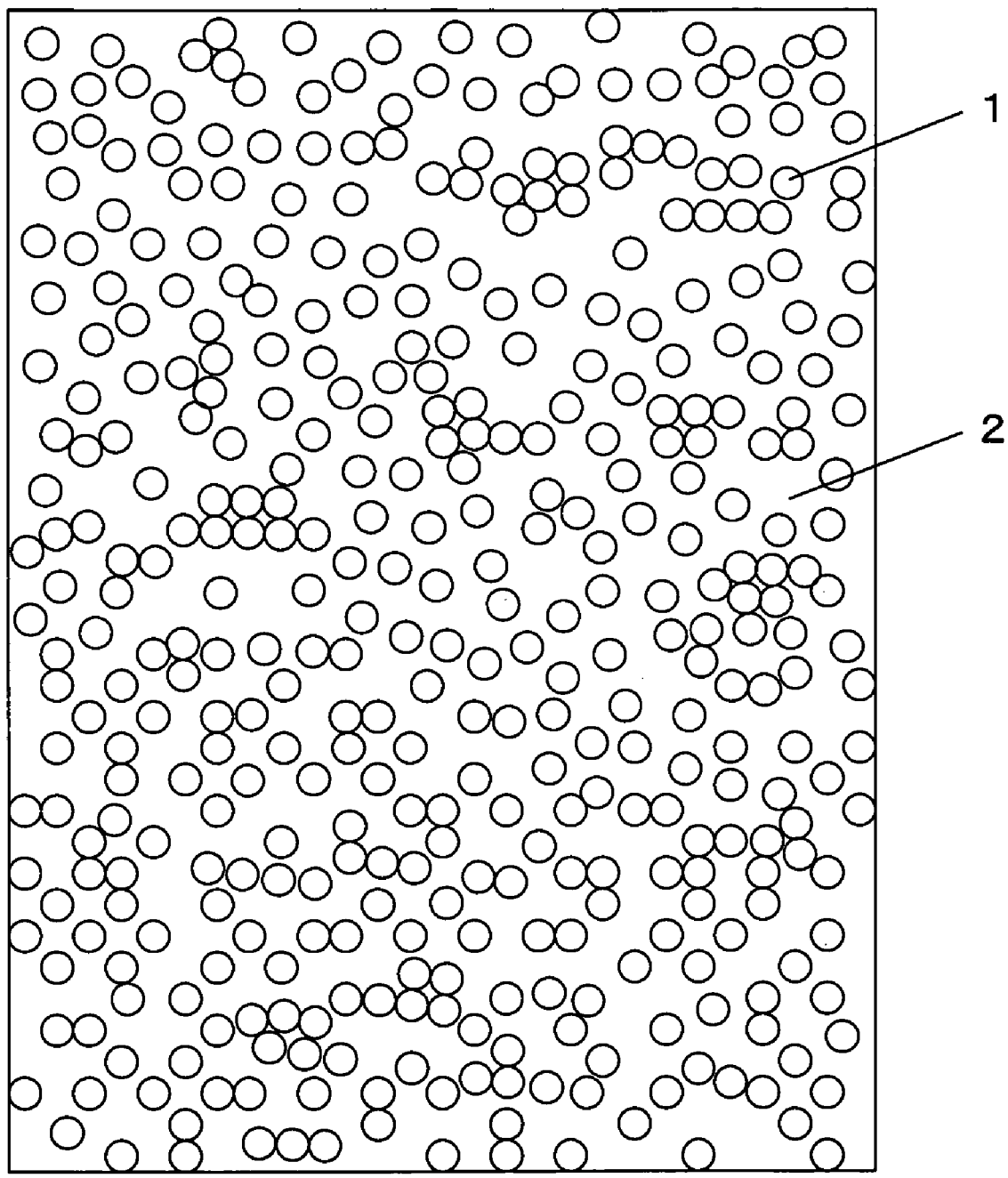
FIG. 1 schematically shows a section of a fiber-reinforced thermoplastic resin molded article in which monofilamentous carbon fibers are dispersed in a thermoplastic resin.
Figure 2:
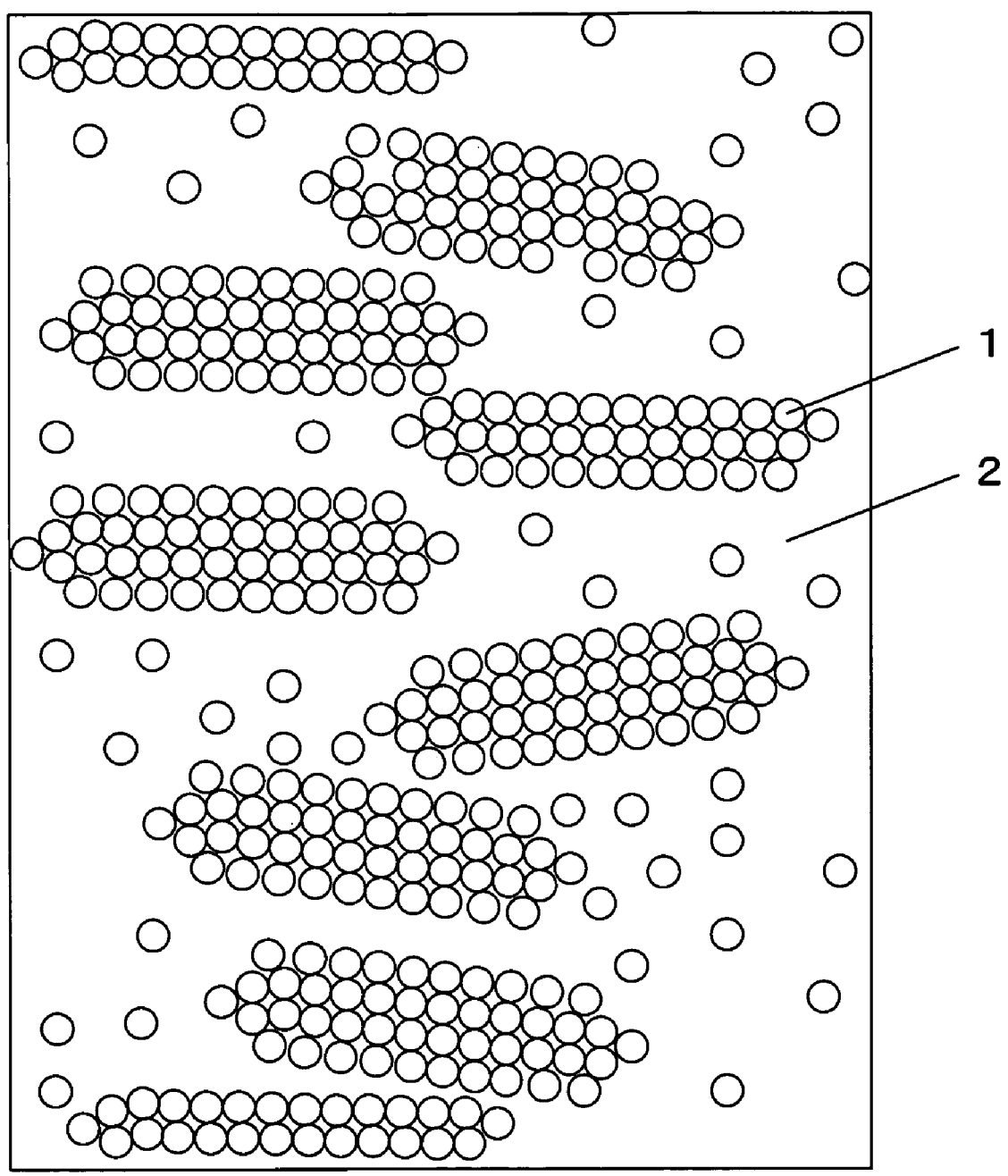
FIG. 2 schematically shows a section of a fiber-reinforced thermoplastic resin molded article in which bundles of carbon fibers are present.

Carbon fibers in the fiber-reinforced thermoplastic resin molded article of the present invention are monofilamentous fibers. Herein, the term "monofilamentous" refers to conditions under which substantially uniform dispersion of carbon fibers is found in a section of the fiber-reinforced thermoplastic resin molded article as shown in FIG. 1. When bundles of carbon fibers are found in a section of the fiber-reinforced thermoplastic resin molded article as shown in FIG. 2, a resin-rich portion consisting of a resin is generated in gaps between carbon fiber bundles, and this might cause a decrease in mechanical properties. In addition, the presence of bundles of carbon fibers makes it impossible for a thermoplastic resin to impregnate carbon fiber bundles. Thus, non-impregnated portions are generated, and this might cause a decrease in mechanical properties.

The weight-average fiber length (Lw) of carbon fibers in the fiber-reinforced thermoplastic resin molded article of the present invention is preferably 0.5 to 10 mm, more preferably 0.8 to 8 mm, and further preferably 1 to 7 mm. When the weight-average fiber length (Lw) of carbon fibers is less than 0.5 mm, mechanical properties of the molded article might become insufficient when it is used for structural parts. When such length exceeds 10 mm, monofilamentous carbon fibers cannot be formed. In such case, voids are generated in the molded article, which might cause reduction in mechanical properties.

In terms of mechanical properties, the number-average fiber length (Ln) of carbon fibers in the fiber-reinforced thermoplastic resin molded article of the present invention is preferably 0.4 to 9 mm, more preferably 0.7 to 7 mm, and further preferably 0.9 to 6 mm.

Herein, the weight-average fiber length (Lw) and the number-average fiber length (Ln) are measured by the following method. Measurement is carried out by extracting carbon fibers from a fiber-reinforced thermoplastic resin molded article, selecting 400 carbon fibers in a random manner, measuring the carbon fiber length (1-μm units) with an optical microscope or a scanning electron microscope, and calculating the weight-average fiber length (Lw) and the number-average fiber length (Ln) by the following equations.

Weight-average fiber length $(Lw) = \Sigma(Li \times Wi/100)$

Number-average fiber length $(Ln) = (\Sigma Li)/400$

Li: Measured fiber length (i=1, 2, 3 ... 400)

Wi: Weight fraction of fibers with a fiber length of Li (i=1, 2, 3 ... 400)

Regarding a method for extracting carbon fibers, a portion of a fiber-reinforced thermoplastic resin molded article is excised and sufficiently dissolved in a solvent capable of dissolving a thermoplastic resin, and then carbon fibers can be separated by a conventional operation such as filtration. When a solvent capable of dissolving a thermoplastic resin is not used, a technique comprising excising a portion of a fiber-reinforced thermoplastic resin molded article, removing a thermoplastic resin therefrom via incineration with a heating furnace, and separating carbon fibers therefrom is used. When the measured number of carbon fibers extracted in a random manner is 400 or more, there is substantially no change in the calculated weight-average fiber length (Lw) and number-average fiber length (Ln) of carbon fibers.

The oriented state of carbon fibers on the surface of the fiber-reinforced thermoplastic resin molded article of the present invention is represented by the orientation parameter (fp). The orientation parameter (fp) of the fiber-reinforced thermoplastic resin molded article of the present invention indicates a parameter representing the fiber orientation distribution of carbon fibers contained in a portion located at a depth of 100 μm from the fiber-reinforced thermoplastic resin molded article surface, such parameter corresponding to a numerical value from −1.0 to 1.0. An fp of −1.0 or 1.0 means that carbon fibers are oriented in a single direction. An fp of 0.0 means that carbon fibers are completely randomly arranged. According to the present invention, when the fp is from −0.25 to 0.25, carbon fibers on the fiber-reinforced thermoplastic resin molded article surface are substantially randomly arranged such that the effects of the present invention can be sufficiently exerted. The fp is preferably from −0.2 to 0.2, more preferably from −0.15 to 0.15, and further preferably −0.1 to 0.1. When the fp is less than −0.25 or exceeds 0.25, the orientation bias of carbon fibers is increased, which might result in deterioration of isotropy in mechanical properties.

Regarding the orientation parameter (fp), a method for calculating an orientation parameter by measuring the fiber orientation angle in a section of an injection molding product has been disclosed in Polymer Composites, vol. 6, pp. 41-46 (1985). In the present invention, the orientation parameter (fp) of a fiber-reinforced thermoplastic resin molded article was measured by the following method. A portion of a fiber-reinforced thermoplastic resin molded article is excised, a test piece obtained by polishing the portion to a depth of 100 μm from the fiber-reinforced thermoplastic resin molded article surface is observed with an optical microscope, and 400 carbon fibers are selected in a random manner. In general, a carbon fiber is recognized to have an oval cross section on such a polished surface. The longitudinal direction of such oval is designated as the fiber orientation direction. Next, a base straight line serving as the initial line for an angle is arbitrarily predetermined. Each angle formed by the base straight line and the line extending in the orientation direction of a selected carbon fiber (hereinafter abbreviated as orientation angle αi) is measured. The orientation angle αi is designated to be an angle of 0° to less than 180° when measuring the angle formed by the base straight line and such line in a counterclockwise manner. The orientation parameter (fp) was calculated by the following equations with the use of the orientation angle αi.

$$fp = 2 \times \Sigma(\cos 2\alpha i/400) - 1$$

αi: measured orientation angle (i=1, 2, 3 ... 400)

When the number of carbon fibers extracted in a random manner is 400 or more, there is substantially no change in the value of the orientation parameter (fp). In addition, there is no change in the value of the orientation parameter (fp) derived from a region located at a depth of 150 μm or less from the fiber-reinforced thermoplastic resin molded article surface. Thus, the orientation parameter (fp) on the fiber-reinforced thermoplastic resin molded article surface can be measured. A portion used for measuring the orientation parameter (fp) of the fiber-reinforced thermoplastic resin molded article is not particularly limited. However, measurement is preferably carried out with the use of portions located as near as possible to the center portion (excluding edge portions) of the fiber-reinforced thermoplastic resin molded article, such portions having no boss, rib, or molded article thickness variations.

Regarding the fiber-reinforced thermoplastic resin molded article of the present invention, in terms of mechanical properties, the dispersion parameter of carbon fibers contained therein is preferably 0% to 25%, more preferably 0% to 22%, and further preferably 0% to 20%. The dispersion parameter of a fiber-reinforced thermoplastic resin molded article is an index representing a variation of the weight content of carbon fibers contained in a fiber-reinforced thermoplastic resin molded article. According to the present invention, such index is expressed as a value obtained by measuring a variation in the number of carbon fibers in a section of a fiber-reinforced thermoplastic resin molded article. Such dispersion parameter is calculated by the following method. A portion of a fiber-reinforced thermoplastic resin molded article is excised and a section of the portion is polished for optical microscope observation. 10 areas (0.1 mm×0.1 mm) on the section are selected in a random manner and the number of carbon fibers contained in each area is determined. The symbols "A" and "S" denote the mean value of the numbers of carbon fibers contained in the 10 selected areas and the standard deviation, respectively. The dispersion parameter is obtained by the following equation.

Dispersion parameter=$(100 \times S/A)$(units: %)

In addition, a portion subjected to measurement of the dispersion parameter of a fiber-reinforced thermoplastic resin molded article is not particularly limited. However, measurement is preferably carried out with the use of portions located as near as possible to the center portion (excluding edge portions) of a fiber-reinforced thermoplastic resin molded article, such portions having no boss, rib, or molded article thickness variations.

Regarding the fiber-reinforced thermoplastic resin molded article of the present invention, in terms of isotropy in mechanical properties, the maximum value of the relative frequency (with a class interval of 30°) with respect to the frequency distribution of orientation angles of carbon fibers is preferably 0.29 or less, more preferably 0.26 or less, and further preferably 0.23 or less. In addition, regarding the fiber-reinforced thermoplastic resin molded article of the present invention, in terms of isotropy in mechanical properties, the minimum value of the relative frequency (with a class interval of 30°) with respect to the frequency distribution of orientation angles of carbon fibers is preferably 0.03 or more, more preferably 0.06 or more, and further preferably 0.10 or more. The relative frequency (with a class interval of 30°) with respect to the frequency distribution of orientation angles of carbon fibers is an index representing the orientation angle distribution of carbon fibers on the fiber-reinforced thermoplastic resin molded article surface. According to the present invention, the relative frequency (with a class interval of 30°) is obtained based on the orientation angles of carbon fibers contained in a portion located at a depth of 100 μm from the fiber-reinforced thermoplastic resin molded article surface. The maximum value and the minimum value of the relative frequency (with a class interval of 30°) with respect to the frequency distribution of orientation angles of carbon fibers are measured by the following method. The aforementioned orientation angles αi of 400 carbon fibers used for calculation of the orientation parameter (fp) were used to create the relative frequency distribution (with a class interval of 30°) of orientation angles of carbon fibers. The maximum and minimum values thereof were designated as the maximum and minimum values of the relative frequency (with a class interval of 30°) with respect to the frequency distribution of orientation angles of carbon fibers. When the number of carbon fibers extracted in a random manner is 400 or more, there is substantially no change in the maximum and minimum values of the relative frequency (with a class interval of 30°) with respect to the frequency distribution of orientation angles of carbon fibers. In addition, in the case of a region located at a depth of 150 μm from the fiber-reinforced thermoplastic resin molded article surface, there is substantially no change in the maximum and minimum values of the relative frequency (with a class interval of 30°) with respect to the frequency distribution of orientation angles of carbon fibers. Accordingly, the orientation angle distribution of carbon fibers on the fiber-reinforced thermoplastic resin molded article surface can be measured. In addition, a portion subjected to measurement to determine the maximum and minimum values of the relative frequency (with a class interval of 30°) with respect to the frequency distribution of orientation angles of carbon fibers is not particularly limited. However, measurement is preferably carried out with the use of portions located as near as possible to the center portion (excluding edge portions) of the fiber-reinforced thermoplastic resin molded article, such portions having no boss, rib, or molded article thickness variations. When each of the maximum and minimum values of the relative frequency (with a class interval of 30°) with respect to the frequency distribution of orientation angles of carbon fibers is 0.17, it is meant that carbon fibers are completely randomly arranged on the fiber-reinforced thermoplastic resin molded article surface.

Regarding the fiber-reinforced thermoplastic resin molded article of the present invention, in terms of mechanical properties, the number of carbon fibers having fiber lengths of 1.0 mm or more corresponds to preferably 30% to 100%, more preferably 35% to 95%, and further preferably 40% to 90% of the total number of carbon fibers.

Regarding the fiber-reinforced thermoplastic resin molded article of the present invention, in terms of mechanical properties, the number of carbon fibers having fiber lengths of 2.0 mm or more corresponds to preferably 10% to 100%, more preferably 15% to 95%, and further preferably 20% to 90% of the total number of carbon fibers.

Regarding the fiber-reinforced thermoplastic resin molded article of the present invention, in terms of mechanical properties, the number of carbon fibers having fiber lengths of 3.0 mm or more corresponds to preferably 2% to 100%, more preferably 3% to 95%, and further preferably 5% to 90% of the total number of carbon fibers.

Regarding the fiber-reinforced thermoplastic resin molded article the present invention, in terms of mechanical properties, the void fraction is preferably 5% or less, more preferably 3% or less, and more preferably 2% or less. The void fraction of a fiber-reinforced thermoplastic resin molded article is measured by the following method. A portion of a fiber-reinforced thermoplastic resin molded article is excised and the density of the fiber-reinforced thermoplastic resin molded article ($\rho c$) is measured in accordance with the test method A of JIS K 7112 (5) (1999) (water displacement method). The void fraction (Vv) of a fiber-reinforced thermoplastic resin molded article is obtained by the following equation with the use of the density of a fiber-reinforced thermoplastic resin molded article ($\rho c$) and the density of a thermoplastic resin ($\rho r$).

$$Vv = 100 - \rho c/\rho r \text{(units: \% by volume)}$$

A portion subjected to measurement of the void fraction (Vv) of a fiber-reinforced thermoplastic resin molded article is not particularly limited. However, measurement is preferably carried out with the use of portions located as near as possible to the center portion (excluding edge portions) of a fiber-reinforced thermoplastic resin molded article, such portions having no boss, rib, or molded article thickness variations.

The bending strength of the fiber-reinforced thermoplastic resin molded article of the present invention measured in accordance with ISO178 is preferably from 350 to 1100 MPa, more preferably from 370 to 1000 MPa, and further preferably from 400 to 900 MPa. When the bending strength falls within such a preferable range, such molded article is regarded as having the strength necessary to be used for a structural part in a preferred embodiment.

Further, in terms of isotropy in mechanical properties, the stability of the bending strength of the fiber-reinforced thermoplastic resin molded article of the present invention measured in accordance with ISO178 is preferably 10% or less, more preferably 8% or less, and further preferably 7% or less. The lower limit of bending strength stability is not particularly limited. However, in terms of isotropic mechanical properties of structural parts, it is most preferably 0%.

Furthermore, in terms of application to structural parts, the bending elastic modulus of the fiber-reinforced thermoplastic resin molded article of the present invention measured in accordance with ISO178 is preferably 17 GPa or more, more preferably 20 GPa, and further preferably 23 GPa.

"Carbon Fibers"

Preferred examples of carbon fibers used for the fiber-reinforced thermoplastic resin molded article of the present invention include PAN-based carbon fibers made from polyacrylonitrile fibers, pitch-based carbon fibers made from coal tar and a petroleum pitch, cellulose-based carbon fibers made from viscose rayon, cellulose acetate, and the like, vapor grown carbon fibers made from hydrocarbon and the like, and graphitized fibers of the above examples. In addition, two or more of the above examples may be blended. Particularly preferably, PAN-based carbon fibers that are excellent in terms of the balance between strength and elastic modulus are used.

In addition, the tensile strength of carbon fibers used for the fiber-reinforced thermoplastic resin molded article of the present invention is preferably 3.7 GPa or more, more preferably 4.0 GPa or more, and further preferably 4.2 GPa or more. In the above cases, breakage of carbon fibers in a fiber-reinforced thermoplastic resin molded article can be reduced. Also, the tensile elastic modulus of such carbon fiber that can be preferably used is 180 to 650 GPa in terms of application to structural parts.

"Thermoplastic Resin"

Examples of a thermoplastic resin used for the fiber-reinforced thermoplastic resin molded article of the present invention include: crystalline resins such as polyesters (e.g., polyethylene terephthalate (PET), polybutylene terephthalate (PBT), polytrimethylene terephthalate (PTT), polyethylene naphthalate (PEN), and liquid crystal polyester), polyolefins (e.g., polyethylene (PE), polypropylene (PP), and polybutylene), polyoxymethylene (POM), polyamide (PA), polyphenylene sulfide (PPS), polyketone (PK), polyetherketone (PEK), polyetheretherketone (PEEK), polyetherketoneketone (PEKK), polyethernitrile (PEN), fluorine-based resins (e.g., polytetrafluoroethylene), and liquid crystal polymer (LCP); amorphous resins such as styrene-based resins, polycarbonate (PC), polymethylene methacrylate (PMMA), polyvinyl chloride (PVC), polyphenylene ether (PPE), polyimide (PI), polyamideimide (PAI), polyetherimide (PEI), polysulfone (PSU), polyethersulfone, and polyallylate (PAR); other thermoplastic elastomers including phenol resin, phenoxy resin, polystyrene, polyolefin, polyurethane, polyester, polyamide, polybutadiene, polyisoprene, fluorine, acrylonitrile, and the like; and thermoplastic resins selected from among copolymers and denatured resins of the above examples. According to the present invention, at least one member of the above examples can be used as a preferable thermoplastic resin. In terms of mechanical properties, polyamide (PA) is more preferable. In terms of thermostability, polyphenylene sulfide (PPS), polyetherimide (PEI), and polyetheretherketone (PEEK) are more preferable. Polypropylene (PP) is economically preferable.

"Additives, Fillers, and the Like"

The following substances and agents may be further added to the fiber-reinforced thermoplastic resin molded article of the present invention in accordance with the application thereof: filling materials such as mica, talc, kaoline, sericite, bentonite, xonotlite, sepiolite, smectite, montmorillonite, walastenite, silica, calcium carbonate, glass beads, glass flakes, glass microballoons, clay, molybdenum disulfide, titanium oxide, zinc oxide, antimony oxide, calcium polyphosphate, graphite, barium sulfate, magnesium sulfate, zinc borate, calcium borite, aluminum borate whisker, potassium titanate whisker, and high-molecular compounds; conductivity-imparting materials such as metal-based materials, metallic oxide-based materials, carbon black, and graphite powder; halogen-based flame retardants such as a brominated resin; antimony-based flame retardants such as antimony trioxide and antimony pentoxide; phosphorus-based flame retardants such as polyphosphate ammonium, aromatic phosphate, and red phosphorus; organic acid metallic salt-based flame retardants such as organic metal borate, metal carboxylate, and aromatic sulfonimide metallic salt; inorganic flame retardants such as zinc borate, zinc, zinc oxide, and zirconium compounds; nitrogen-based flame retardants such as cyanuric acid, isocyanuric acid, melamine, melamine cyanurate, melamine phosphate, and nitrogenated guanidine; fluorine-based flame retardants such as PTFE; silicone-based flame retardants such as polyorganosiloxane; metallic hydroxide-based flame retardants such as aluminum hydroxide and magnesium hydroxide; other flame retardants; flame retardant aids such as cadmium oxide, zinc oxide, cuprous oxide, cupric oxide, ferrous oxide, ferric oxide, cobalt oxide, manganese oxide, molybdenum oxide, tin oxide, and titanium oxide; pigments; colorants; lubricants; release agents; compatibilizers; dispersing agents; crystalline nucleus agents such as mica, talc, and kaoline; plasticizers such as phosphate ester; thermal stabilizers; antioxidants; color protectors; UV absorbents; fluidity modifiers; foaming agents; antibacterial agents; vibration dampers; deodorants; sliding modifiers; and antistatic agents such as polyether esteramide.

In addition to carbon fibers, the fiber-reinforced thermoplastic resin molded article of the present invention may comprise metal fibers such as aluminium fibers and stainless steel fibers, organic fibers such as alamido fibers and PBO fibers, inorganic fibers such as silicon carbide fibers and glass fibers, and natural fibers such as hemp and kenaf. In particular, glass fibers are economically advantageous and thus are preferably used.

"Applications"

The fiber-reinforced thermoplastic resin molded article of the present invention can be used for the following applications: electric/electronic device parts such as "housings, trays, chassis, internal members, and cases of personal computers, displays, office automation equipments, cell phones, handheld terminals, facsimile terminals, compact discs, portable MDs, portable radio cassettes, PDAs (handheld terminals such as electronic notebooks), video cameras, digital video cameras, optical instruments, audio players, air conditioners, lighting apparatuses, amusement products, toys and games, other home electric appliances, and the like;" civil engineering and building parts such as "struts, panels, and reinforcing materials;" automobile and two-wheel vehicle structural parts including "suspensions, accelerators, and steering parts such as a variety of members, a variety of frames, a variety of hinges, a variety of arms, a variety of axles, a variety of wheel bearings, a variety of beams, propeller shafts, wheels, and gearboxes," "exterior panels and body parts such as hoods, roofs, doors, fenders, trunk lids, side panels, rear-end panels, upper back panels, front bodies, under bodies, a variety of pillars, a variety of members, a variety of frames, a variety of beams, a variety of supports, a variety of rails, and a variety of hinges," "exterior parts such as bumpers, bumper beams, moldings, undercovers, engine covers, current plates, spoilers, cowl louvers, and aeroparts," "interior parts such as instrument panels, seat frames, door trims, pillar trims, handles, and a variety of modules," and "fuel-related parts and parts used for emission or intake such as motor parts, CNG tanks, gasoline tanks, fuel pumps, air intakes, intake manifolds, carburetor main bodies, carburetor spacers, a variety of pipes, and a variety of valves;" other automobile and two-wheel vehicle parts such as "alternator terminals, alternator connectors, IC regulators, potentiometer bases (for light dimmers), engine cooling water joints, thermostat bases used for air conditioners, heating air flow control bulbs, radiator motor brush holders, turbine vanes, wiper-motor-related parts, distributors, starter switches, starter relays, window washer nozzles, air conditioner panel switch substrates, fuel-related electromagnetic valve coils, battery trays, AT brackets, head lamp supports, pedal housings, protectors, horn terminals, step motor rotors, lamp sockets, lamp reflectors, lamp housings, brake pistons, noise shields, spare tire covers, solenoid bobbins, engine oil filters, igniter cases, scuff plates, and facers;" and airplane parts such as "landing gear pods, winglets, spoilers, edges, ladders, elevators, fairings, and ribs." In terms of mechanical properties, the molded article is preferably used for electric/electronic device housings, civil engineering and building panels, automobile structural parts, and airplane parts. In particular, in terms of mechanical properties and isotropy, the molded article is preferably used for automobile and two-wheeled vehicle structural parts.

"Molding Materials"

Next, the molding material of the present invention is described.

The molding material of the present invention is a molding material comprising thermoplastic resin fibers that are monofilamentous thermoplastic resin fibers (20% to 65% by weight) and carbon fibers that are monofilamentous carbon fibers (35% to 80% by weight), wherein the weight-average fiber length (Lw) of the carbon fibers is from 1 to 15 mm and the herein-defined orientation parameter (fp) of the carbon fibers is from −0.25 to 0.25.

The weight content of carbon fibers in the molding material of the present invention is 35% to 80% by weight, more preferably 38% to 75% by weight, and further preferably 40% to 70% by weight with respect to the weight of the molding material. When the weight content of carbon fibers is less than 35% by weight, mechanical properties of the fiber-reinforced thermoplastic resin molded article might become insufficient when it is used for structural parts. Further, when a molding material becomes fluid in a step of molding a fiber-reinforced thermoplastic resin molded article such that carbon fibers become oriented in the flow direction of the fluid material, isotropy in mechanical properties might deteriorate. In addition, when the weight content of carbon fibers exceeds 80% by weight, the amount of a thermoplastic resin relative to that of carbon fibers is essentially decreased. Accordingly, the mechanical properties of a fiber-reinforced thermoplastic resin molded article might be significantly reduced.

The molding material of the present invention comprises monofilamentous carbon fibers and monofilamentous thermoplastic resin fibers. Thus, a three-dimensional mesh structure is formed with monofilamentous carbon fibers and monofilamentous thermoplastic resin fibers. Therefore, in a step of producing a molding material or in a step of producing a fiber-reinforced thermoplastic resin molded article with the use of a molding material, the amounts of loss of starting materials used for carbon fibers and thermoplastic resin fibers can be reduced. In addition, the strength of a molding material can be improved. Accordingly, a molding material with good handleability can be obtained. When carbon fibers and thermoplastic resin fibers are formed in bundles, carbon fibers are less likely to become tangled with thermoplastic resin fibers, which would result in increases in the amounts of loss of starting materials used for carbon fibers and thermoplastic resin fibers. Further, the strength of a molding material might deteriorate. Further, in a case of a thermoplastic resin in a particle form, such thermoplastic resin cannot be maintained in a molding material, resulting in an increase in the amount of loss of a starting material of thermoplastic resin particles.

In view of formation of the mesh structure, it is preferable that thermoplastic resin fibers come into contact with at least two carbon fibers in the molding material of the present invention. The number of such carbon fibers in contact with thermoplastic resin fibers is more preferably 3 or more, further preferably 5 or more, and particularly preferably 10 or more.

The weight-average fiber length (Lw) of carbon fibers in the molding material of the present invention is 1 to 15 mm, preferably 1.5 to 12.5 mm, and more preferably 2 to 10 mm. When the weight-average fiber length (Lw) of carbon fibers is less than 1 mm, mechanical properties of a molding material might become insufficient when it is used for structural parts. When such length exceeds 15 mm, monofilamentous carbon fibers cannot be formed. In such case, voids are generated in a molded article, which might cause a reduction in mechanical properties.

In terms of mechanical properties, the number-average fiber length (Ln) of carbon fibers in the molding material of the present invention is preferably 1 to 15 mm, more preferably 1.5 to 12.5 mm, and further preferably 2 to 10 mm.

Herein, the weight-average fiber length (Lw) and the number-average fiber length (Ln) of a molding material are measured as in the cases of measurement methods for the weight-average fiber length (Lw) and the number-average fiber length (Ln) of a fiber-reinforced thermoplastic resin molded article.

The oriented state of carbon fibers on the molding material surface of the present invention is represented by the orientation parameter (fp). According to the present invention, when the orientation parameter (fp) of a molding material is from −0.25 to 0.25, carbon fibers on the molding material surface are substantially randomly arranged and thus the effects of the present invention can be fully expressed. Such parameter is preferably from −0.2 to 0.2 and more preferably from −0.15 to 0.15. When the orientation parameter (fp) is less than −0.25 or exceeds 0.25, the orientation bias of carbon fibers is increased. In such case, isotropy in mechanical properties of a molded article might be harmed.

The orientation parameter (fp) of the molding material of the present invention refers to a parameter presenting the fiber orientation distribution of carbon fibers contained in a portion located at a depth of 100 μm from the molding material surface, such parameter corresponding to a numerical value from −1.0 to 1.0. The parameter is determined by the following method. A portion of a molding material is excised and embedded in an epoxy resin and then the resultant is polished to a depth of 100 μm from the molding material surface, such that a test piece for observation is prepared. Measurement is carried out in the same manner as in the case of the orientation parameter (fp) of a fiber-reinforced thermoplastic resin molded article, except that such a test piece for observation is prepared.

In the case of the molding material of the present invention, since a molded article has isotropy as a mechanical property, the maximum value of the relative frequency (with a class interval of 30°) with respect to the frequency distribution of orientation angles of carbon fibers is preferably 0.29 or less, more preferably 0.26 or less, and further preferably 0.23 or less. In addition, in the case of the molding material of the present invention, since a molded article has isotropy as a mechanical property, the minimum value of the relative frequency (with a class interval of 30°) with respect to the frequency distribution of orientation angles of carbon fibers is preferably 0.03 or more, more preferably 0.06 or more, and further preferably 0.10 or more. The relative frequency (with a class interval of 30°) with respect to the frequency distribution of orientation angles of carbon fibers on the molding material surface is an index representing the orientation angle distribution of carbon fibers on the molding material surface. According to the present invention, the relative frequency (with a class interval of 30°) is obtained based on the orientation angles of carbon fibers contained in a portion located at a depth of 100 μm from the molding material surface. The relative frequency (with a class interval of 30°) with respect to the frequency distribution of orientation angles of carbon fibers on the molding material surface is measured in the same manner as in the case of a fiber-reinforced thermoplastic resin molded article.

In terms of handleability, the dispersion parameter of carbon fibers contained in the molding material of the present invention is preferably 0% to 25%, more preferably 0% to 22%, and further preferably 0% to 20%. The parameter for dispersion in a molding material is an index representing a variation of the weight content of carbon fibers contained in the molding material. In the present invention, such parameter is expressed as a value obtained by measuring a variation in the carbon fiber number in a molding material section. The parameter for dispersion in a molding material is measured in the same manner as in the case of the aforementioned parameter for dispersion in a fiber-reinforced thermoplastic resin molded article, except that a portion of a molding material is excised and embedded in an epoxy resin and then the molding material section is polished, such that a test piece for observation is prepared.

The aforementioned mesh structure is formed in the molding material of the present invention. Thus, the value corresponding to the ratio of weight-average fiber length (Lw) of carbon fibers to number-average fiber length of the same (Ln) (Lw/Ln) is preferably from 1.0 to 2.5, more preferably from 1.0 to 2.2, and further preferably from 1.0 to 2.0. Herein, conditions under which the value corresponding to the ratio of weight-average fiber length (Lw) to number-average fiber length (Ln) (Lw/Ln) is 1.0 indicate that the structure is formed exclusively with fibers having the same length. This means, therefore, that the larger the value corresponding to the ratio of weight-average fiber length (Lw) to number-average fiber length (Ln) (Lw/Ln), the wider the fiber length distribution.

In terms of handleability, the molding material of the present invention is preferably in a sheet form. A molding material in a sheet form is a thin and wide molding material having a small degree of thickness in a longitudinal or width direction. Examples thereof include web, nonwoven fabric, felt, and mat.

"Carbon Fibers"

Preferably, carbon fibers that can be used for the molding material of the present invention are carbon fibers similar to those used for the aforementioned fiber-reinforced thermoplastic resin molded article.

Preferably, carbon fibers that can be used for the molding material of the present invention are carbon fibers having a tensile strength and a tensile elastic modulus similar to those of carbon fibers used for the aforementioned fiber-reinforced thermoplastic resin molded article.

"Thermoplastic Resin"

Preferably, a thermoplastic resin that can be used for the molding material of the present invention is a thermoplastic resin similar to that used for the aforementioned fiber-reinforced thermoplastic resin molded article.

"Additives, Fillers, and the Like"

The molding material of the present invention may contain additives, fillers, and the like that are similar to those further added to the aforementioned fiber-reinforced thermoplastic resin molded article.

"Applications"

Preferably, the molding material of the present invention can be used for applications similar to those of the aforementioned fiber-reinforced thermoplastic resin molded article.

"Method for Producing a Molding Material"

Next, a method for producing a molding material is described.

A method for producing a molding material is not particularly limited as long as the aforementioned molding material can be obtained thereby. Examples of such method include: (1): an air-jet flow method comprising carrying out fiber opening of bundles of chopped carbon fibers and thermoplastic resin fibers in an air-jet flow, mixing the resultant, and cumulating the mixture on a conveyor belt; (2): a papermaking method comprising carrying out fiber opening of bundles of chopped carbon fibers and thermoplastic resin fibers in a dispersion solution, mixing the resultant, carrying out papermaking on a porous support; and (3): a dry method comprising carrying out fiber opening of bundles of chopped carbon fibers and thermoplastic resin fibers with a carding machine, mixing the resultant, and cumulating the mixture on a conveyor belt. According to the present invention, an air-jet flow method or a papermaking method is more preferably used. This is because such a method is excellent in terms of the ability of fiber opening of carbon fibers and thermoplastic resin fibers and the maintenance of a long carbon fiber length. Further preferably, a papermaking method is used in terms of productivity.

In addition, in the case of an air-jet flow method, the isotropy of a molding material may be improved by controlling the current of an air flow so as to uniformly mix monofilamentous carbon fibers and monofilamentous thermoplastic resin fibers. In the case of a papermaking method, the isotropy of a molding material may be improved by decreasing the carbon fiber concentration in a dispersion solution, employing a stirring blade for stirring a dispersion solution, such blade being formed in a manner such that a large stirring force can be obtained, or increasing the number of revolutions of a stirring blade so as to uniformly mix monofilamentous carbon fibers and monofilamentous thermoplastic resin fibers.

"Method for Producing a Fiber-reinforced Thermoplastic Resin Molded Article"

Next, a method for producing the fiber-reinforced thermoplastic resin molded article of the present invention is described.

According to the production method of the present invention, the above molding material is formed by a compression molding method comprising at least the following steps (I) to (V):

(I) a step of heating and melting a thermoplastic resin contained in a molding material;

(II) a step of positioning the molding material in a die;

(III) a step of pressurizing the molding material with the die;

(IV) a step of solidifying the molding material in the die; and (V) a step of opening the die so as to demold a fiber-reinforced thermoplastic resin molded article therefrom.

The above molding material is subjected to compression molding such that the long fiber length of reinforcing fibers can be maintained and carbon fibers are substantially randomly arranged, such that a fiber-reinforced thermoplastic resin molded article with excellent mechanical properties and isotropy can be obtained. For instance, in the case of injection molding, the fiber length of carbon fibers becomes shortened and carbon fibers are oriented in the flow direction of a fluid material. Accordingly, mechanical properties of the fiber-reinforced thermoplastic resin molded article deteriorate and isotropy might also be harmed. A compression molding method is not particularly limited. Examples thereof include stamping molding and high pressure press molding.

Regarding the heating temperature in the above step (I), in a case in which a thermoplastic resin in a molding material is a crystalline resin, the temperature of such molding material is preferably from the melting point of a thermoplastic resin to the melting point+80° C. in terms of the moldability of a molding material and deterioration in a thermoplastic resin. In a case in which a thermoplastic resin of a molding material is a non-crystalline resin, the temperature of such molding material is preferably from the glass transition temperature of a thermoplastic resin+60° C. to the glass transition temperature+200° C.

In the above step (I), a method for heating and melting of a thermoplastic resin in a molding material is not particularly limited. Examples of such method that can be used include conventionally known methods involving hot-air heating, far-infrared heating, near-infrared heating, hot plate contact heating, hot roll contact heating, vibrational heating, and the like.

In the above step (I), in terms of deterioration in a thermoplastic resin, it is further preferable that heating and melting be carried out in an inert gas atmosphere containing nitrogen, argon, or the like or under reduced pressure.

In terms of deterioration in a thermoplastic resin, a step of removing the moisture contained in a molding material may be added prior to the above step (I). A method for removing the moisture contained in a molding material is not particularly limited. Examples of such method that can be used include conventionally known methods involving hot-air drying, far-infrared drying, near-infrared drying, vacuum drying, reduced pressure aspiration, centrifugation, and the like.

In the above steps (II) and (III), in terms of the moldability of a molding material, it is preferable to position a molding material comprising a molten thermoplastic resin in a die and to pressurize a molding material comprising a molten thermoplastic resin.

In the above step (II), when a fiber-reinforced thermoplastic resin molded article comprising portions having different thicknesses is formed, a molding material may be laminated so as to be formed in a plurality of layers and then positioned in a die, in terms of moldability of a molding material.

In the above step (II), in terms of isotropy in mechanical properties of a fiber-reinforced thermoplastic resin molded article, the charging percentage is preferably 80% or more, more preferably 90% or more, and further preferably 95% or more. The term "charging percentage" refers to the percentage of the surface area of a molding material with respect to the cavity area of a die.

Regarding the die temperature in the above steps (II) to (V), in a case in which a thermoplastic resin is a crystalline resin, the molding material temperature is preferably at the melting point of a thermoplastic resin −30° C. or less, in terms of demolding properties of a fiber-reinforced thermoplastic resin molded article. In a case in which a thermoplastic resin is a non-crystalline resin, the molding material temperature is preferably at the glass transition temperature of a thermoplastic resin+50° C. or less. The term "die temperature" used herein refers to the temperature of the cavity surface of a die.

In the above step (III), it is preferable that an operation comprising releasing the pressurization on a molding material and repressurizing the molding material be repeated at least once. It is possible to emit air in the cavity or air contained in a molding material from the die by releasing the pressurization on a molding material and repressurizing the molding material. Such operation may be repeatedly carried out until the void fraction of a fiber-reinforced thermoplastic resin molded article becomes preferably 5% or less, more preferably 3% or less, and further preferably 2% or less.

The fiber-reinforced thermoplastic resin molded article and the molding material of the present invention are specifically described below with reference to the following examples, although the technical scope of the present invention is not limited thereto.

Hereinafter, evaluation methods used in the Examples and the Comparative Examples are described.

(1) Method for Measuring Fiber Length, Weight-average Fiber Length (Lw), and Number-average Fiber Length (Ln)

A portion of a molding material or a fiber-reinforced thermoplastic resin molded article was excised and the matrix resin thereof was sufficiently dissolved with a solvent capable of dissolving a matrix resin (thermoplastic resin). Then, carbon fibers were separated therefrom by a conventional operation such as filtration. When a solvent capable of dissolving a thermoplastic resin was not used, a portion of a molding material or a fiber-reinforced thermoplastic resin molded article was excised and the thermoplastic resin fibers thereof were removed by burning by heating at a temperature of 500° C. for 2 hours, such that carbon fibers were separated therefrom. The thus separated carbon fibers (400 fibers) were extracted in a random manner. The fiber length of each carbon fiber was measured (1-μm units) with an optical microscope or a scanning electron microscope. Then, the weight-average fiber length (Lw) and the number-average fiber length (Ln) were obtained by the following equations.

Weight-average fiber length $(Lw)=\Sigma(Li \times Wi/100)$

Number-average fiber length $(Ln)=(\Sigma Li)/400$ $Li$: Measured fiber length (i=1, 2, 3 … 400)

$Wi$: Weight fraction of fibers with a fiber length of Li (i=1, 2, 3 … 400)

In addition, when the measured number of carbon fibers extracted in a random manner was 400 or more, there was substantially no change in the calculated weight-average fiber length (Lw) and number-average fiber length (Ln) of carbon fibers.

(2) Dispersion Parameter Evaluation Method

A portion of a fiber-reinforced thermoplastic resin molded article was excised. The excised test piece was embedded in an epoxy resin and then a section of the fiber-reinforced thermoplastic resin molded article was polished, such that a test piece for observation was prepared.

In addition, a portion of a molding material was excised. The excised molding material was sandwiched by two glass plates each having a size equivalent to that of the excised test piece. The resultant was held and fixed with a clip. The resultant in such state was embedded in an epoxy resin and a section of the molding material was polished, such that a test piece for observation was prepared.

A section obtained by polishing a fiber-reinforced thermoplastic resin molded article or a molding material was observed with an optical microscope. 10 areas (0.1 mm×0.1 mm) on the section are selected in a random manner and the number of carbon fibers contained in each area was determined. The symbols "A" and "S" denote the mean value of the numbers of carbon fibers contained in the 10 selected areas and the standard deviation, respectively. The dispersion parameter was obtained by the following equation.

Dispersion parameter=$(100 \times S/A)$(units: %)

In addition, portions located as near as possible to the center portion (excluding edge portions) of a fiber-reinforced thermoplastic resin molded article or a molding material, such portions having no boss, rib, or molded article thickness variations, were used as test pieces subjected to measurement of the dispersion parameter of a fiber-reinforced thermoplastic resin molded article or a molding material The dispersion parameter derived from a section of a fiber-reinforced thermoplastic resin molded article or a molding material was measured as an index representing variation of the weight content of carbon fibers contained in a fiber-reinforced thermoplastic resin molded article or a molding material. The results were evaluated with the following 4-level rating system. The symbols "oo" and "o" indicate "Passed" and the symbols "Δ" and "x" indicate "Failed:"
oo: a dispersion parameter of less than 20%;
o: a dispersion parameter of 20% to less than 25%;
Δ: a dispersion parameter of 25% to less than 30%; and
x: a dispersion parameter of 30% or more.

(3) Orientation Parameter (fp) Evaluation Method

A portion of a fiber-reinforced thermoplastic resin molded article was excised, the excised test piece was embedded in an epoxy resin, and the surface of the fiber-reinforced thermoplastic resin molded article was polished to a depth of 100 μm from the fiber-reinforced thermoplastic resin molded article surface. Thus, a test piece for observation was prepared.

In addition, a portion of a molding material was excised, the excised test piece was embedded in an epoxy resin, and the surface of the molding material was polished to a depth of 100 μm from the molding material surface. Thus, a test piece for observation was prepared.

A test piece for observation of a fiber-reinforced thermoplastic resin molded article or a molding material was observed with an optical microscope and 400 carbon fibers were selected in a random manner. In general, a carbon fiber is recognized to have an oval cross section on the polished surface. The longitudinal direction of such oval was designated as the fiber orientation direction. Next, a base straight line serving as the initial line for an angle was arbitrarily predetermined. Each angle formed by the base straight line and the line extending in the orientation direction of a selected carbon fiber (hereinafter abbreviated as orientation angle $\alpha i$) was measured. The orientation angle $\alpha i$ was designated to be an angle of 0° to less than 180° when measuring the angle formed by the base straight line and such line in a counter-clockwise manner. The orientation parameter (fp) of a fiber-reinforced thermoplastic resin molded article or a molding material was obtained by the following equations with the use of the orientation angle $\alpha i$.

$fp=2 \times \Sigma(\cos 2\alpha i/400)-1$ $\alpha i$: measured orientation angle (i=1, 2, 3 … 400)

In addition, portions located as near as possible to the center portion (excluding edge portions) of a fiber-reinforced thermoplastic resin molded article or a molding material, such portions having no boss, rib, or molded article thickness variations, were used as test pieces subjected to measurement of the "orientation parameter" of a fiber-reinforced thermoplastic resin molded article or a molding material.

The orientation parameter (fp) of a fiber-reinforced thermoplastic resin molded article or a molding material was measured as an index for the random arrangement of carbon fibers. The results were evaluated with the following 4-level rating system. The symbols "oo" and "o" indicate "Passed" and the symbols "Δ" and "x" indicate "Failed:"

oo: an fp of "−0.15≦fp≦0.15;"
o: an fp of "−0.25≦fp<−0.15," or "0.15<fp≦0.25;"
Δ: an fp of "−0.35≦fp<−0.25" or "0.25<fp≦0.35;" and
x: an fp of "−1≦fp<−0.35" or "0.35<fp≦1."

(4) Orientation Angle Distribution Evaluation Method

A portion of a fiber-reinforced thermoplastic resin molded article was excised, the excised test piece was embedded in an epoxy resin, and the surface of the fiber-reinforced thermoplastic resin molded article was polished to a depth of 100μ from the fiber-reinforced thermoplastic resin molded article surface. Thus, a test piece for observation was prepared.

In addition, a portion of a molding material was excised, the excised test piece was embedded in an epoxy resin, and the surface of the molding material was polished to a depth of 100μ from the molding material surface. Thus, a test piece for observation was prepared.

A test piece for observation of a fiber-reinforced thermoplastic resin molded article or a molding material was observed with an optical microscope and 400 carbon fibers were selected in a random manner. In general, a carbon fiber is recognized to have an oval cross section on the polished surface. The longitudinal direction of such oval was designated as the fiber orientation direction. Next, a base straight line serving as the initial line for an angle was arbitrarily predetermined. Each angle formed by the base straight line and the line extending in the orientation direction of a selected carbon fiber (hereinafter abbreviated as orientation angle αi) was measured. The orientation angle αi was designated to be an angle of 0° to less than 180° when measuring the angle formed by the base straight line and such line in a counter-clockwise manner. The relative frequency (with a class interval of 30°) was obtained based on the orientation angle αi by the following equations.

αi: measured orientation angle (i=1, 2 ... 400)

N: 0 to 30: Number of carbon fibers (i=1, 2 ... 400)
(0≦orientation angle αi<30)

N: 30 to 60: Number of carbon fibers (i=1, 2 ... 400)
(30≦orientation angle αi<60)

N: 60 to 90: Number of carbon fibers (i=1, 2 ... 400)
(60≦orientation angle αi<90)

N: 90 to 120: Number of carbon fibers (i=1, 2 ... 400)(90≦orientation angle αi<120)

N: 120 to 150: Number of carbon fibers (i=1, 2 ... 400)(120≦orientation angle αi<150)

N: 150 to 180: Number of carbon fibers (i=1, 2 ... 400)(150≦orientation angle αi<180)

Maximum value of relative frequency=MAX (N: 0 to 30; N: 30 to 60; N: 60 to 90; N: 90 to 120; N: 120 to 150; N: 150 to 180)/400

Minimum value of relative frequency=MIN (N: 0 to 30; N: 30 to 60; N: 60 to 90; N: 90 to 120; N: 120 to 150; N: 150 to 180)/400

In addition, portions located as near as possible to the center portion (excluding edge portions) of a fiber-reinforced thermoplastic resin molded article or a molding material, such portions having no boss, rib, or molded article thickness variations, were used as test pieces subjected to measurement of the orientation angle distribution of a fiber-reinforced thermoplastic resin molded article or a molding material.

The maximum value of the relative frequency with respect to the orientation angle distribution of a fiber-reinforced thermoplastic resin molded article or a molding material was measured as an index for the random orientation of fibers. The results were evaluated with the following 4-level rating system. The symbols "oo" and "o" indicate "Passed" and the symbols "Δ" and "x" indicate "Failed:"

oo: a maximum value of the relative frequency of 0.17 or more to 0.23 or less;
o: a maximum value of the relative frequency of more than 0.23 to 0.29 or less;
Δ: a maximum value of the relative frequency of more than 0.29 to 0.35 or less; and
x: a maximum value of the relative frequency of more than 0.35.

In addition, the minimum value of the relative frequency with respect to the orientation angle distribution of a fiber-reinforced thermoplastic resin molded article or a molding material was measured as an index for the random orientation of fibers. The results were evaluated with the following 4-level rating system. The symbols "oo" and "o" indicate "Passed" and the symbols "Δ" and "x" indicate "Failed:"

oo: a minimum value of the relative frequency of 0.10 or more to 0.17 or less;
o: a minimum value of the relative frequency of 0.03 or more to less than 0.10;
Δ: a minimum value of the relative frequency of 0.01 or more to less than 0.03; and
x: a minimum value of the relative frequency of 0 or more to less than 0.01.

(5) Method for Measuring the Weight Content of Carbon Fibers

A test piece (1 cm×1 cm) was excised from a fiber-reinforced thermoplastic resin molded article or a molding material and introduced into a quartz glass container. The container was subjected to vacuum drying at a temperature of 60° C. for 24 hours and then cooling to room temperature in a desiccator. Thereafter, the total weight of the test piece and the quartz glass container W1 (g) and the weight of the quartz glass container W0 (g) were weighed. The test piece placed in the container was heated at a temperature of 500° C. for 2 hours in the air such that a thermoplastic resin was removed by burning. Subsequently, the test piece was cooled to room temperature in a nitrogen atmosphere. Then, the total weight of carbon fibers and the quartz glass container W2 (g) was weighed. After the above treatments, the weight content (Wf) of carbon fibers contained in a fiber-reinforced thermoplastic resin molded article or a molding material was obtained by the following equation.

$$Wf=100\times(W2-W0)/(W1-W0)\text{(units: \% by weight)}$$

Note that the sample number for measurement was designated as "n=5" and the mean value was designated as the weight content (Wf) of carbon fibers.

(6) Method for Determining the Density of a Fiber-reinforced Thermoplastic Resin Molded Article The density of a fiber-reinforced thermoplastic resin molded article (ρc) was measured in accordance with the test method A of JIS K 7112 (5) (1999) (water displacement method). A test piece (1 cm×1 cm) was excised from a fiber-reinforced thermoplastic resin molded article or a molding material, followed by vacuum drying at a temperature of 60° C. for 24 hours and then cooling to room temperature in a desiccator. The resultant was designated as a test piece. Ethanol was used as an immersion solution.

(7) Method for Evaluating the Volume Content and the Void Fraction of Carbon Fibers Contained in a Fiber-reinforced Thermoplastic Resin Molded Article With the use of the weight content (Wf) of carbon fibers contained in a fiber-reinforced thermoplastic resin molded article measured in (5) and the density (ρc) of a fiber-reinforced thermoplastic resin molded article measured in (6), the volume content of carbon fibers contained in a fiber-reinforced thermoplastic resin molded article (Vf), the volume content of a thermoplastic resin (Vr), and the void fraction (Vv) were obtained by the following equations.

$$Vf = Wf \times \rho c/\rho f \text{(units: \% by volume)}$$

$$Vr = (100 - Wf) \times \rho c/\rho r \text{(units: \% by volume)}$$

$$Vv = 100 - (Vf + Vr) \text{(units: \% by volume)}$$

ρc: Density of a fiber-reinforced thermoplastic resin molded article
ρf: Density of carbon fibers
ρr: Density of a thermoplastic resin
Wf: Weight content of carbon fibers contained in a fiber-reinforced thermoplastic resin molded article (8) Method for Determining Bending Properties A single base straight line was arbitrarily determined as a base straight line serving as the initial line for an angle for a fiber-reinforced thermoplastic resin molded article. Test pieces (width: 15 mm×length: 80 mm) were excised (10 pieces in total), provided that for five of them, the longitudinal direction of each thereof was parallel to the base straight line, and for the other five of them, the longitudinal direction of each thereof was perpendicular to the same. Vacuum drying at a temperature of 60° C. for 24 hours was carried out, followed by cooling at room temperature in a desiccator. When it was impossible to obtain test pieces for evaluation of bending properties in such size, a test piece having a width of 5 mm or more (ratio of the width to the length=15:80) was prepared. Portions located as near as possible to the center portion (excluding edge portions) of a fiber-reinforced thermoplastic resin molded article, such portions having no boss, rib, or molded article thickness variations, were used as test pieces.

Bending properties were determined with the use of the test pieces in accordance with ISO178 (1993) using a three-point bending jig (indenter: 10 mm; fulcrum: 10 mm), provided that the inter-fulcrum distance was determined to be 16±1 times as large as the test piece thickness and the test speed was 5 mm/minute. In addition, the sample number for measurement was designated as "n=10" and the mean value P was designated as the bending strength. Further, the bending elastic modulus was measured with a load of 100 to 200 N. Then, the mean value E (sample number for measurement: n=10) was designated as the bending elastic modulus. In addition, in the Examples, the testing machine used was an "Instron" (registered trademark) universal testing machine 4201 (Instron).

In addition, the bending strength stability was obtained by the following equation with the use of the mean value P of the bending strength (sample number for measurement: n=10) and the standard deviation σ.

$$\text{Bending strength stability} = 100 \times \sigma/P \text{(units: \%)}$$

(9) Handleability of a Molding Material

The total weight of a thermoplastic resin and carbon fibers used for producing a molding material (Wa) was measured. Next, the obtained molding material was dried in vacuo at a temperature of 80° C. for 24 hours. The weight of the dried molding material (Wb) was measured. Then, the percentage of the starting material lost in the step of producing a molding material (Wc) was obtained by the following equation.

$$Wc = 100 \times (Wa - Wb)/Wa \text{(units: \%)}$$

The amount of the starting material lost in the step of producing a molding material was measured as an index for the handleability of a molding material. The results were evaluated with the following 2-level rating system. The symbol "o" indicates "Passed" and the symbol "x" indicates "Failed:"

o: Wc of 3% or less; and
x: Wc of more than 3%.

Starting materials used in the following Examples and Comparative Examples are described below.

[Starting Materials A1 to A3]

Acryl-based fiber bundles (single fiber denier: 1 d; number of filaments: 12000) were obtained by a dry-wet spinning method with the use of a copolymer comprising acrylonitrile (AN: 99.4 mol %) and methacrylic acid (0.6 mol %). The obtained acryl-based fiber bundles were heated in the air at a temperature of 240° C. to 280° C. at a stretch ratio of 1.05 so as to be converted into flame-resistant fibers. Next, stretching by 10% was carried out in a nitrogen atmosphere at a temperature increase rate of 200° C./minutes within the temperature range of 300° C. to 900° C., followed by baking with a temperature increase to 1300° C. Further, a sizing agent was added thereto by an immersion method, followed by drying in air heated to a temperature of 120° C. Thus, PAN-based carbon fibers were obtained.

| A1: PAN-based carbon fiber | |
|---|---|
| Total filament number: | 12000 filaments |
| Single fiber diameter: | 7 μm |
| Mass per unit length: | 0.8 g/m |
| Specific gravity: | 1.8 g/cm$^3$ |
| Tensile strength: | 4.2 GPa |
| Tensile elastic modulus: | 230 GPa |
| Sizing type: | polyoxyethylene oleyl ether |
| Amount of the added sizing agent: | 1.5% by weight |
| A2: PAN-based carbon fiber | |
| Total filament number: | 12000 filaments |
| Single fiber diameter: | 7 μm |
| Mass per unit length: | 0.8 g/m |
| Specific gravity: | 1.8 g/cm$^3$ |
| Tensile strength: | 4.2 GPa |
| Tensile elastic modulus: | 230 GPa |
| Sizing type: | Bisphenol A epoxy resin |
| Amount of the added sizing agent: | 2.0% by weight. |
| [Starting materials B1 to B3] | |
| B1: Nylon 6 resin | |
| "TORAY AMILAN" (registered trademark) CM 1001 (Toray) | |
| Specific gravity: | 1.13 |
| Melting point: | 210° C. |
| B2: Maleic-anhydride-denatured polypropylene resin | |
| "Adomer" (registered trademark) QE510 | |
| (Mitsubishi Chemical Corporation) | |
| Specific gravity: | 0.91 |
| Melting point: | 160° C. |
| B3: Polybutylene terephthalate resin | |
| "TORAYCON" (registered trademark) 1200S (Toray) | |
| Specific gravity: | 1.31 |
| Melting point: | 225° C. |

EXAMPLE 1

A1 (carbon fiber) was cut to a length of 6.4 mm with a cartridge cutter such that chopped carbon fibers (A1-1) were obtained. Fibers (degree of single fiber: 3 dtex) of B1 (nylon 6 resin) were cut to a length of 5.0 mm with a cartridge cutter such that chopped resin fibers (B1-1) were obtained.

A dispersion solution (200 liters; concentration: 0.1% by weight) containing water and a surfactant (polyoxyethylene lauryl ether (product name), Nacalai Tesque, Inc.) was prepared. A1-1 (chopped carbon fibers, 107 g) and B1-1 (chopped resin fibers, 153 g) were added to the dispersion solution, followed by stirring for 10 minutes. The resultant was introduced into a large-size square sheet machine (No. 2553-I (product name), Kumagai Riki Kogyo Co., Ltd.) having a papermaking face (length: 400 mm×width: 400 mm), followed by aspiration and defoaming. Accordingly, a molding material 400 mm in length and 400 mm in width was obtained. The weight content of carbon fibers was 41% by weight.

The obtained molding material was dried in vacuo at a temperature of 80° C. for 24 hours. Two sheets of the molding material were preheated to 280° C. in a nitrogen atmosphere in a far-infrared heating furnace. The two sheets of the preheated molding material were positioned so as to be laminated with each other in a die having a flat-plate-shaped cavity (thickness: 1.6 mm; length: 400 mm×width: 400 mm) at a cavity surface temperature of 150° C. (charging percentage: 100%). The die was closed and pressurized at a molding pressure of 30 MPa. When the molding pressure reached 30 MPa, molding pressure was released with a time lag of two seconds. Immediately after the completion of pressure release, the pressurizing operation at a molding pressure of 30 MPa was again repeated twice such that the air contained in the molding material was removed. Subsequently, the die was maintained at a pressurized state of 30 MPa for 2 minutes and then opened, followed by demolding. Thus, a fiber-reinforced thermoplastic resin molded article was obtained.

EXAMPLE 2

A molding material 400 mm in length and 400 mm in width was obtained in the same manner as in Example 1, except that A1-1 (chopped carbon fibers, 139 g) and B1-1 (chopped resin fibers, 133 g) were added to a dispersion solution. The weight content of carbon fibers was 51% by weight.

In addition, a fiber-reinforced thermoplastic resin molded article was obtained in the same manner as in Example 1.

Figure 3:
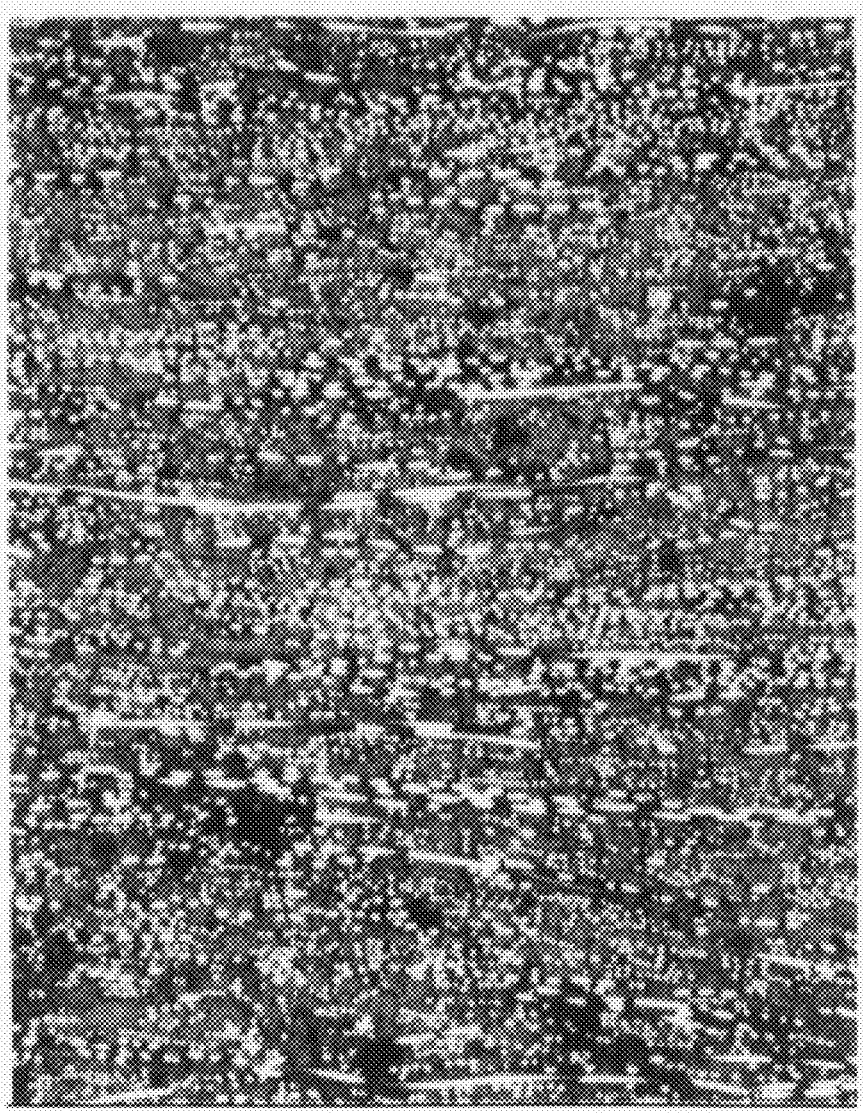
FIG. 3 is an optical microscopic image of a section of a fiber-reinforced thermoplastic resin molded article obtained in Example 2 of the present invention.
Figure 3:
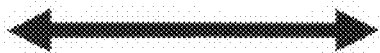

FIG. 3 is an optical microscopic image showing a longitudinal section of a fiber-reinforced thermoplastic resin molded article obtained in Example 2 of the present invention.

EXAMPLE 3

A molding material 400 mm in length and 400 mm in width was obtained in the same manner as in Example 1, except that A1-1 (chopped carbon fibers, 193 g) and B1-1 (chopped resin fibers, 99 g) were added to a dispersion solution. The weight content of carbon fibers was 66% by weight.

In addition, a fiber-reinforced thermoplastic resin molded article was obtained in the same manner as in Example 1.

EXAMPLE 4

A1 (carbon fiber) was cut to a length of 2.0 mm with a cartridge cutter such that chopped carbon fibers (A1-2) were obtained. A molding material 400 mm in length and 400 mm in width was obtained in the same manner as in Example 1, except that A1-2 (chopped carbon fibers, 139 g) and B1-1 (chopped resin fibers, 133 g) were added to a dispersion solution. The weight content of carbon fibers was 51% by weight.

In addition, a fiber-reinforced thermoplastic resin molded article was obtained in the same manner as in Example 1.

EXAMPLE 5

A1 (carbon fiber) was cut to a length of 12.7 mm with a cartridge cutter such that chopped carbon fibers (A1-3) were obtained. A molding material 400 mm in length and 400 mm in width was obtained in the same manner as in Example 1, except that A1-3 (chopped carbon fibers, 70 g) and B1-1 (chopped resin fibers, 67 g) were added to a dispersion solution. The weight content of carbon fibers was 51% by weight.

A fiber-reinforced thermoplastic resin molded article was obtained in the same manner as in Example 1, except that four sheets of the molding material were preheated to 280° C. in a nitrogen atmosphere in a far-infrared heating furnace and the four sheets of the preheated molding material were positioned so as to be laminated with each other in a die having a flat-plate-shaped cavity.

EXAMPLE 6

Fibers (degree of single fiber: 3 dtex) of B1 (nylon 6 resin) were cut to a length of 3.0 mm with a cartridge cutter such that chopped resin fibers (B1-2) were obtained. A1-1 (chopped carbon fibers, 139 g) and B1-2 (chopped resin fibers, 133 g) were added to a dispersion container. Herein, the dispersion container used was a container having a cylindrical shape (bottom diameter: 600 mm; height: 600 mm), an internal volume of 200 liters, an air injection inlet for introduction of high-speed air (provided on the side surface toward the center portion of the base), an air outlet for air discharge (provided via a filter on the upper face), and a detachable base through which an introduced starting material can be collected. High-speed air was introduced into a dispersion container such that A1-1 (chopped carbon fibers) and B1-2 (chopped resin fibers) were subjected to fiber opening, followed by mixing for 10 minutes. After mixing, air introduction was terminated and thus a mixture of A1-1 (chopped carbon fibers) and B1-2 (chopped resin fibers) was accumulated on the base surface of the dispersion container. The base of the dispersion container was removed and the mixture was cut to a length of 400 mm and a width of 400 mm. Thus, a molding material was obtained. The weight content of carbon fibers was 51% by weight.

In addition, a fiber-reinforced thermoplastic resin molded article was obtained in the same manner as in Example 1.

COMPARATIVE EXAMPLE 1

A1-1 (chopped carbon fibers) was sufficiently dried so as to have a moisture content of 0.05% or less with the use of a TEX•30α-type biaxial extruding machine (screw: 30 mm (diameter); barrel: 270° C. (temperature); number of revolutions: 150 rpm, JSW). The resultant was introduced from a side hopper and B1 (nylon 6 resin) was introduced from a main hopper, followed by sufficient kneading. A base material 0.8 mm in thickness and 300 mm in width was continuously extruded via a sheet dies, followed by cooling. The base material was cut to a length of 1000 mm with a cutter. Thus, a molding material containing carbon fibers at a weight content of 41% by weight was obtained.

In addition, a fiber-reinforced thermoplastic resin molded article was obtained in the same manner as in Example 1.

COMPARATIVE EXAMPLE 2

A2 (carbon fiber) was cut to a length of 6.4 mm with a cartridge cutter such that chopped carbon fibers (A2-1) were obtained. A molding material 400 mm in length and 400 mm in width was obtained in the same manner as in Example 1, except that A2-1 (chopped carbon fibers, 174 g) and B1-1 (chopped resin fibers, 111 g) were added to a dispersion solution. The weight content of carbon fibers was 61% by weight.

Figure 4:
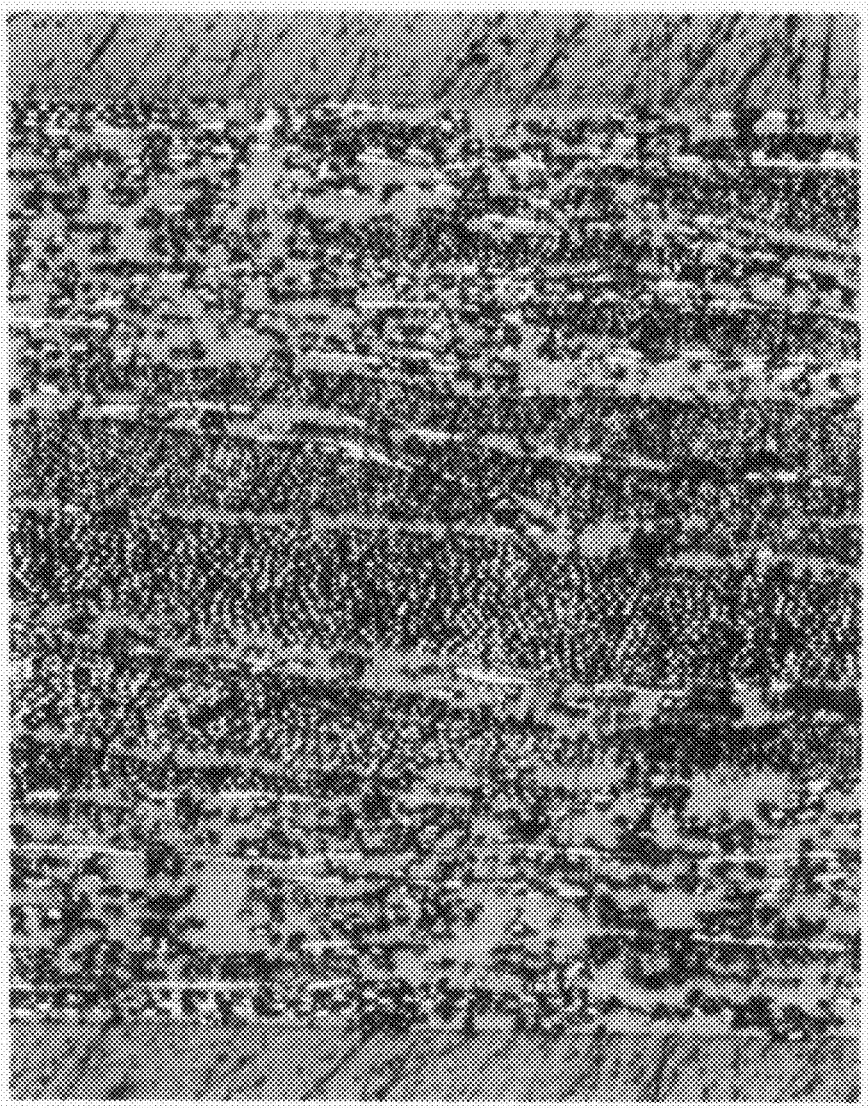
FIG. 4 is an optical microscopic image of a section of a fiber-reinforced thermoplastic resin molded article obtained in Comparative Example 2 of the present invention.
Figure 4:
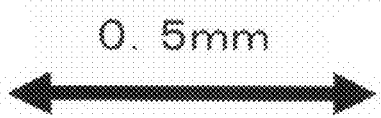

In addition, a fiber-reinforced thermoplastic resin molded article was obtained in the same manner as in Example 1. FIG. 4 is an optical microscopic image showing a longitudinal section of a fiber-reinforced thermoplastic resin molded article obtained in Comparative Example 2.

COMPARATIVE EXAMPLE 3

The molding material obtained in Comparative Example 1 was cut to a length of 7 mm and a width of 7 mm and dried in vacuo at 80° C. for 24 hours. Then, a flat-plate-shaped fiber-reinforced thermoplastic resin molded article (thickness: 1.6 mm; length: 200 mm×width: 200 mm) was obtained using J350EIII equipped with a full-flight screw (The Japan Steel Works, Ltd.) at 60 rpm (screw revolutions per minute), a cylinder temperature of 280° C., an injection rate of 90 mm/sec, an injection pressure of 200 MPa, a back pressure of 0.5 MPa, and a die temperature of 55° C. The weight content of carbon fibers was 41% by weight.

COMPARATIVE EXAMPLE 4

A molding material 400 mm in length and 400 mm in width was obtained in the same manner as in Example 1, except that A1-1 (chopped carbon fibers, 70 g) and B1-1 (chopped resin fibers, 176 g) were added to a dispersion solution. The weight content of carbon fibers was 28% by weight.

In addition, a fiber-reinforced thermoplastic resin molded article was obtained in the same manner as in Example 1.

COMPARATIVE EXAMPLE 5

Pellets of B1 (nylon 6 resin) were subjected to freeze disruption. The obtained disrupted particles were sorted by sieving with a 14-mesh sieve (pore diameter: 1.18 mm). Disrupted particles that had passed through the 14-mesh sieve were further sorted by sieving with a 60-mesh sieve (pore diameter: 0.25 mm). Disrupted particles remaining on the 60-mesh sieve were collected such that 14- to 60-mesh resin particles (B1-2) were obtained. A molding material 400 mm in length and 400 mm in width was obtained in the same manner as in Example 1, except that A1-1 (chopped carbon fiber, 139 g) and B1-2 (resin particles, 133 g) were added to a dispersion solution. The weight content of carbon fibers was 56% by weight because resin particles were detached in the molding material.

EXAMPLE 7

Fibers (degree of single fiber: 3 dtex) of B2 (maleic-anhydride-denatured polypropylene resin) were cut to a length of 5.0 mm with a cartridge cutter such that chopped resin fibers (B2-1) were obtained. A molding material 400 mm in length and 400 mm in width was obtained in the same manner as in Example 1, except that A1-1 (chopped carbon fibers, 140 g) and B2-1 (chopped resin fibers, 106 g) were added to a dispersion solution. The weight content of carbon fibers was 57% by weight.

The obtained molding material was dried in vacuo at a temperature of 60° C. for 24 hours. A fiber-reinforced thermoplastic resin molded article was obtained in the same manner as in Example 1, except that two sheets of the molding material were preheated to 210° C. in a nitrogen atmosphere in a far-infrared heating furnace and the two sheets of the preheated molding material were positioned so as to be laminated with each other in a die having a flat-plate-shaped cavity (thickness: 1.6 mm; length: 400 mm×width: 400 mm) at a cavity surface temperature of 100° C.

EXAMPLE 8

A molding material 400 mm in length and 400 mm in width was obtained in the same manner as in Example 1, except that A1-1 (chopped carbon fibers, 193 g) and B2-1 (chopped resin fibers, 80 g) were added to a dispersion solution. The weight content of carbon fibers was 71% by weight.

In addition, a fiber-reinforced thermoplastic resin molded article was obtained in the same manner as in Example 7.

EXAMPLE 9

Fibers (degree of single fiber: 3 dtex) of B3 (polybutylene terephthalate resin) were cut to a length of 5.0 mm with a cartridge cutter such that chopped resin fibers (B3-1) were obtained. A molding material 400 mm in length and 400 mm in width was obtained in the same manner as in Example 1, except that A1-1 (chopped carbon fibers, 105 g) and B3-1 (chopped resin fibers, 179 g) were added to a dispersion solution. The weight content of carbon fibers was 37% by weight.

The obtained molding material was dried in vacuo at a temperature of 130° C. for 24 hours. A fiber-reinforced thermoplastic resin molded article was obtained in the same manner as in Example 1, except that two sheets of the molding material were preheated to 270° C. in a nitrogen atmosphere in a far-infrared heating furnace and the two sheets of the preheated molding material were positioned so as to be laminated with each other in a die having a flat-plate-shaped cavity (thickness: 1.6 mm; length: 400 mm×width: 400 mm) at a cavity surface temperature of 130° C.

EXAMPLE 10

A molding material 400 mm in length and 400 mm in width was obtained in the same manner as in Example 1, except that A1-1 (chopped carbon fibers, 140 g) and B3-1 (chopped resin fibers, 153 g) were added to a dispersion solution. The weight content of carbon fibers was 48% by weight.

In addition, a fiber-reinforced thermoplastic resin molded article was obtained in the same manner as in Example 9.

COMPARATIVE EXAMPLE 6

A molding material 400 mm in length and 400 mm in width was obtained in the same manner as in Example 1, except that A1-1 (chopped carbon fibers, 246 g) and B2-1 (chopped resin fibers, 53 g) were added to a dispersion solution. The weight content of carbon fibers was 82% by weight.

In addition, a fiber-reinforced thermoplastic resin molded article was obtained in the same manner as in Example 7.

The evaluation results for the fiber-reinforced thermoplastic resin molded articles of Examples 1 to 6 and Comparative Examples 1 to 4 are summarized in table 1.

The evaluation results for the molding materials of Examples 1 to 6 and Comparative Examples 1, 2, 4, and 5 are summarized in table 2.

Based on the results of Examples 1 to 6 and Comparative Examples 1 to 4 shown in table 1, the following facts are obvious. Specifically, the fiber-reinforced thermoplastic resin molded article of Example 1 is superior to the fiber-reinforced thermoplastic resin molded article of Comparative Example 1 in terms of mechanical properties. The fiber-reinforced thermoplastic resin molded article of Example 1 is superior to the fiber-reinforced thermoplastic resin molded article of Comparative Example 3 in terms of isotropy. In addition, the fiber-reinforced thermoplastic resin molded articles of Examples 1, 2, and 3 are superior to the fiber-reinforced thermoplastic resin molded article of Comparative Example 2 in terms of mechanical properties. In addition, the fiber-reinforced thermoplastic resin molded articles of Examples 1, 2, 3, 4, 5, and 6 are superior to the fiber-reinforced thermoplastic resin molded article of Comparative Example 4 in terms of isotropy.

Based on the results of Examples 1 to 6 and Comparative Examples 1, 2, 4, and 5 shown in table 2, the following facts are obvious. Specifically, molding materials of Examples 1, 2, 3, 4, 5, and 6 are superior to those of Comparative Examples 1 and 4 in terms of isotropy. In addition, the molding materials of Examples 1, 2, and 3 are superior to those of Comparative Examples 2 and 5 in terms of molding material handleability.

The evaluation results of the fiber-reinforced thermoplastic resin molded articles of Examples 7 to 10 and Comparative Example 6 are summarized in table 3. The evaluation results of the molding materials of Examples 7 to 10 and Comparative Example 6 are summarized in table 4.

Based on the results of Examples 7 to 10 and Comparative Example 6 shown in table 3, the following facts are obvious. Specifically, the fiber-reinforced thermoplastic resin molded articles of Examples 7 and 8 are superior to the fiber-reinforced thermoplastic resin molded article of Comparative Example 6 in terms of mechanical properties. In addition, it is shown that the fiber-reinforced thermoplastic resin molded articles of Examples 7 to 10 have high mechanical properties when obtained from different types of thermoplastic resins.

Based on the results of Examples 7 to 10 and Comparative Example 6 shown in table 4, the following facts are obvious. Specifically, the molding materials of Examples 7 and 8 are superior to the molding material of Comparative Example 6 in terms of handleability. In addition, it is shown that the molding materials of Examples 7 to 10 can be obtained as molding materials that are excellent in isotropy and handleability when obtained from different types of thermoplastic resins and carbon fibers.

TABLE 1

Fiber-reinforced thermoplastic resin molded article

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Thermoplastic resin | — | B1 | B1 | B1 | B1 | B1 | B1 | B1 | B1 | B1 | B1 |
| Reinforcing fiber | — | A1 | A1 | A1 | A1 | A1 | A1 | A1 | A2 | A1 | A1 |
| Vf | Vol % | 30 | 40 | 55 | 40 | 40 | 40 | 30 | 50 | 30 | 20 |
| Wf | Wt % | 41 | 51 | 66 | 51 | 51 | 51 | 41 | 61 | 41 | 28 |
| Lw | mm | 3.7 | 3.4 | 2.3 | 1.8 | 3.8 | 3.5 | 0.3 | 2.5 | 0.2 | 4.0 |
| Percentage of the number of fibers (Fiber length >1.0 mm) | % | 83 | 71 | 50 | 39 | 80 | 75 | 2 | 59 | 0 | 87 |
| Percentage of the number of fibers (Fiber length >2.0 mm) | % | 55 | 45 | 19 | 16 | 51 | 42 | 0 | 25 | 0 | 58 |
| Dispersion parameter | — | ○○ | ○○ | ○ | ○○ | ○ | ○ | ○ | x | ○ | ○○ |
| Orientation parameter (fp) | — | ○○ | ○○ | ○ | ○○ | ○○ | ○○ | Δ | x | x | Δ |
| Relative frequency (maximum value) | — | ○○ | ○○ | ○ | ○ | ○ | ○○ | Δ | Δ | x | Δ |
| Relative frequency (minimum value) | — | ○○ | ○○ | ○ | ○ | ○ | ○○ | ○ | Δ | Δ | ○ |
| Void fraction | % | 0 | 2 | 5 | 1 | 2 | 4 | 1 | 14 | 1 | 1 |
| Bending strength | MPa | 560 | 600 | 460 | 400 | 590 | 580 | 230 | 280 | 200 | 380 |
| Bending elastic modulus | GPa | 27 | 31 | 38 | 28 | 32 | 30 | 19 | 23 | 17 | 18 |
| Strength stability | % | 6 | 6 | 8 | 6 | 7 | 7 | 12 | 11 | 15 | 13 |

TABLE 2

Molding material

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Thermoplastic resin | — | B1 | B1 | B1 | B1 | B1 | B1 | B1 | B1 | B1 | B1 |
| Reinforcing fiber | — | A1 | A1 | A1 | A1 | A1 | A1 | A1 | A3 | A1 | A1 |
| Wf | Wt % | 41 | 51 | 66 | 51 | 51 | 51 | 41 | 61 | 28 | 56 |
| Lw | mm | 5.5 | 5.0 | 4.2 | 1.8 | 10.5 | 5.3 | 0.4 | 4.8 | 1.4 | 4.6 |
| Lw/Ln | — | 1.4 | 1.7 | 2.1 | 1.3 | 2.1 | 1.8 | 1.2 | 3.3 | 1.4 | 1.9 |
| Dispersion parameter | — | ○○ | ○○ | ○ | ○○ | ○ | ○ | ○ | x | ○○ | ○○ |

TABLE 2-continued

Molding material

|  | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Orientation parameter (fp) | — | ○ | ○○ | ○ | ○○ | ○○ | ○○ | Δ | Δ | Δ | Δ |
| Relative frequency (maximum value) | — | ○ | ○○ | ○ | ○○ | ○ | ○○ | Δ | Δ | Δ | Δ |
| Relative frequency (minimum value) | — | ○ | ○○ | ○ | ○○ | ○ | ○○ | ○ | x | ○ | ○ |
| Handleability | — | ○ | ○ | ○ | ○ | ○ | ○ | ○ | Δ | ○ | x |

TABLE 3

Fiber-reinforced thermoplastic resin molded article

|  | | Example 7 | Example 8 | Example 9 | Example 10 | Comparative Example 6 |
|---|---|---|---|---|---|---|
| Thermoplastic resin | — | B2 | B2 | B3 | B3 | B2 |
| Reinforcing fiber | — | A1 | A1 | A1 | A1 | A1 |
| Vf | Vol % | 40 | 55 | 30 | 40 | 70 |
| Wf | Wt % | 57 | 71 | 37 | 48 | 82 |
| Lw | mm | 3.1 | 2.1 | 3.4 | 3.1 | 0.8 |
| Percentage of the number of fibers (Fiber length >1.0 mm) | % | 75 | 51 | 83 | 71 | 32 |
| Percentage of the number of fibers (Fiber length >2.0 mm) | % | 49 | 20 | 52 | 47 | 12 |
| Dispersion parameter | — | ○○ | ○ | ○○ | ○○ | Δ |
| Orientation parameter (fp) | — | ○○ | ○ | ○ | ○○ | ○ |
| Relative frequency (maximum value) | — | ○○ | ○ | ○ | ○○ | Δ |
| Relative frequency (minimum value) | — | ○○ | ○ | ○ | ○○ | ○ |
| Void fraction | % | 3 | 6 | 1 | 2 | 29 |
| Bending strength | MPa | 370 | 300 | 460 | 500 | 130 |
| Bending elastic modulus | GPa | 23 | 25 | 23 | 27 | 9 |
| Strength stability | % | 3 | 9 | 5 | 3 | 11 |

TABLE 4

Molding material

|  | | Example 7 | Example 8 | Example 9 | Example 10 | Comparative Example 6 |
|---|---|---|---|---|---|---|
| Thermoplastic resin | — | B2 | B2 | B3 | B3 | B2 |
| Reinforcing fiber | — | A1 | A1 | A1 | A1 | A1 |
| Wf | Wt % | 57 | 71 | 37 | 48 | 82 |
| Lw | mm | 4.8 | 4.0 | 5.2 | 4.8 | 3.1 |
| Lw/Ln | — | 1.8 | 2.0 | 1.5 | 1.7 | 2.8 |
| Dispersion parameter | — | ○○ | ○ | ○○ | ○○ | Δ |
| Orientation parameter (fp) | — | ○○ | ○ | ○○ | ○○ | ○ |
| Relative frequency (maximum value) | — | ○○ | ○ | ○○ | ○○ | Δ |
| Relative frequency (minimum value) | — | ○○ | ○ | ○○ | ○○ | ○ |
| Handleability | — | ○ | ○ | ○ | ○ |  |

INDUSTRIAL APPLICABILITY

In the fiber-reinforced thermoplastic resin molded article of the present invention, monofilamentous carbon fibers are contained in a high content, and such fibers have long fiber lengths and are randomly arranged. Thus, a fiber-reinforced thermoplastic resin molded article with high mechanical properties, particularly isotropic mechanical properties, can be obtained. Such fiber-reinforced thermoplastic resin molded article is useful for parts such as structural parts, housings, and the like for electric/electronic devices, office automation equipments, home electric appliances, civil engineering and building products, automobiles, and airplanes.

The molding material of the present invention comprises monofilamentous carbon fibers and monofilamentous thermoplastic resin fibers and thus is excellent in terms of handleability. In addition, carbon fibers are contained therein in a high content, and such fibers have long fiber lengths and are randomly arranged. Thus, such molding material can be preferably used for a fiber-reinforced thermoplastic resin molded article with excellent mechanical properties and isotropy.

The production method of the present invention, comprising subjecting the molding material to compression molding, is preferably used for production of a fiber-reinforced thermoplastic resin molded article with high mechanical properties and isotropy.

All publications, patents, and patent applications cited herein are incorporated herein by reference in their entirety.

The invention claimed is:

1. A fiber-reinforced thermoplastic resin molded article, which is a molded article comprising a thermoplastic resin 20% to 65% by weight and carbon fibers 35% to 80% by weight, wherein the carbon fibers are monofilamentous fibers, the weight-average fiber length (Lw) of the carbon fibers is from 0.5 to 10 mm, and the herein-defined orientation parameter (fp) of the carbon fibers is from −0.25 to 0.25.

2. The fiber-reinforced thermoplastic resin molded article according to claim 1, wherein the herein-defined dispersion parameter of the carbon fibers is from 0% to 25%.

3. The fiber-reinforced thermoplastic resin molded article according to claim 1, wherein the maximum value of the herein-defined relative frequency (with a class interval of 30°) with respect to the frequency distribution of orientation angles of the carbon fibers is 0.29 or less.

4. The fiber-reinforced thermoplastic resin molded article according to claim 1, wherein the minimum value of the herein-defined relative frequency (with a class interval of 30°) with respect to the frequency distribution of orientation angles of the carbon fibers is 0.03 or more.

5. The fiber-reinforced thermoplastic resin molded article according to claim 1, wherein the number of carbon fibers having fiber lengths of 1.0 mm or more corresponds to 30% to 100% of the total number of the carbon fibers.

6. The fiber-reinforced thermoplastic resin molded article according to claim 1, wherein the herein-defined void fraction of the fiber-reinforced thermoplastic resin molded article is 5% or less.

7. The fiber-reinforced thermoplastic resin molded article according to claim 1, wherein the bending strength in accordance with ISO178 of the fiber-reinforced thermoplastic resin molded article is from 350 to 1100 MPa.

8. The fiber-reinforced thermoplastic resin molded article according claim 1, wherein the stability of the bending strength in accordance with ISO178 of the fiber-reinforced thermoplastic resin molded article is 10% or less.

9. A molding material, which is a molding material comprising thermoplastic resin fibers that are monofilamentous thermoplastic resin fibers 20% to 65% by weight and carbon fibers that are monofilamentous carbon fibers 35% to 80% by weight, wherein the weight-average fiber length (Lw) of the carbon fibers is from 1 to 15 mm and the herein-defined orientation parameter (fp) of the carbon fibers is from −0.25 to 0.25.

10. The molding material according to claim 9, wherein the monofilamentous thermoplastic resin fibers are in contact with at least two of the monofilamentous carbon fibers.

11. The molding material according to claim 9, wherein the maximum value of the herein-defined relative frequency (with a class interval of 30°) with respect to the frequency distribution of orientation angles of the carbon fibers is 0.29 or less.

12. The molding material according to claim 9, wherein the minimum value of the herein-defined relative frequency (with a class interval of 30°) with respect to the frequency distribution of orientation angles of the carbon fibers is 0.03 or more.

13. The molding material according to claim 9, wherein the herein-defined dispersion parameter of the carbon fibers is from 0% to 25%.

14. The molding material according to claim 9, wherein the value corresponding to the ratio of weight-average fiber length of the carbon fibers (Lw) to number-average fiber length of the same (Ln) (Lw/Ln) is from 1.0 to 2.5.

15. A method for producing a fiber-reinforced thermoplastic resin molded article, comprising molding the molding material according to claim 9 by a compression molding method comprising at least the following steps (I) to (V):
(I): a step of heating and melting the thermoplastic resin contained in the molding material;
(II): a step of positioning the molding material in a die;
(III): a step of pressurizing the molding material with the die;
(IV): a step of solidifying the molding material in the die; and
(V): a step of opening the die so as to demold a fiber-reinforced thermoplastic resin molded article therefrom.

16. The method for producing a fiber-reinforced thermoplastic resin molded article according to claim 15, wherein an operation of releasing the pressurization on the molding material and repressurizing the molding material is repeated at least once in the step (III).

17. The method for producing a fiber-reinforced thermoplastic resin molded article according to claim 15, wherein the pressure upon the compression molding is 2 to 40 MPa.

18. The method for producing a fiber-reinforced thermoplastic resin molded article according to claim 15, wherein the charging percentage of the molding material positioned in the cavity of the die is 80% or more.

* * * * *